United States Patent
Langhein

(10) Patent No.: US 9,826,075 B2
(45) Date of Patent: Nov. 21, 2017

(54) TABLET COMPUTER CASE WITH DETACHABLE STAND

(71) Applicant: FLB GROUP LIMITED, Edinburgh, Scotland (GB)

(72) Inventor: Julia Elsa Langhein, England (GB)

(73) Assignee: FLB GROUP LIMITED, Edinburgh, Scotland (GB)

( * ) Notice: Subject to any disclaimer, the term of this patent is extended or adjusted under 35 U.S.C. 154(b) by 0 days.

(21) Appl. No.: 14/963,953

(22) Filed: Dec. 9, 2015

(65) Prior Publication Data

US 2016/0173670 A1    Jun. 16, 2016

Related U.S. Application Data

(63) Continuation of application No. 29/538,610, filed on Sep. 4, 2015, now Pat. No. Des. 750,089, and a (Continued)

(30) Foreign Application Priority Data

Aug. 17, 2015  (EP) .................................. 001438840
Aug. 17, 2015  (EP) .................................. 002755637

(51) Int. Cl.
A47B 97/04    (2006.01)
H04M 1/04    (2006.01)
A45C 11/00    (2006.01)

(52) U.S. Cl.
CPC ............... *H04M 1/04* (2013.01); *A45C 11/00* (2013.01); *A45C 2011/003* (2013.01); *A45C 2200/15* (2013.01)

(58) Field of Classification Search
CPC .... H04M 1/04; A45C 11/00; A45C 2011/002; A45C 2011/003; A45C 2200/15;
(Continued)

(56) References Cited

U.S. PATENT DOCUMENTS 5,329,712 A  *  7/1994  Keller ...................... G09F 1/10
                                                                 248/558
7,281,698 B2    10/2007  Patterson, Jr.
(Continued)

FOREIGN PATENT DOCUMENTS

WO    WO2013158057    10/2013

OTHER PUBLICATIONS

Invitation to Pay Additional Fees dated Feb. 3, 2016 in Int'l App. No. PCT/EP2015/079236, EPO as ISA, 6 pages.
(Continued)

*Primary Examiner* — Christopher E Garft
(74) *Attorney, Agent, or Firm* — Haynes and Boone, LLP

(57) ABSTRACT

In one aspect, an apparatus is adapted to support a mobile electronic device such as, for example, a tablet computer. In another aspect, the apparatus includes a case and a stand adapted to be detachably coupled to the case, the apparatus having a first configuration in which the stand is detachably coupled to the case, and a second configuration in which the stand is detached from the case. In another aspect, the stand is adapted to support the mobile electronic device in an easel-like fashion when the apparatus is in either the first configuration or the second configuration. In another aspect, a kit includes first and second stands adapted to respectively support first and second mobile electronic devices having different sizes; and a case to which each of the first and second stands is adapted to be detachably coupled. In another aspect, the kit is a retail display kit.

28 Claims, 20 Drawing Sheets

Related U.S. Application Data continuation of application No. 29/538,618, filed on Sep. 4, 2015, now Pat. No. Des. 750,634, and a continuation of application No. 29/538,622, filed on Sep. 4, 2015, now Pat. No. Des. 750,086.

(60) Provisional application No. 62/090,084, filed on Dec. 10, 2014.

(58) Field of Classification Search
CPC  A45C 13/002; F16M 11/04; A45B 2097/006; H04B 1/3877; G06F 2200/1633; A47B 2097/006
USPC .............................. 248/444; 206/476; 402/4
See application file for complete search history.

(56) References Cited

U.S. PATENT DOCUMENTS

| | | | |
|---|---|---|---|
| D660,305 S | 5/2012 | Ho et al. | |
| D672,146 S | 12/2012 | Fathollahi | |
| D672,353 S | 12/2012 | Liu | |
| 8,328,008 B2 | 12/2012 | Diebel et al. | |
| D674,803 S | 1/2013 | Westrup | |
| D676,055 S | 2/2013 | Izen et al. | |
| D676,854 S | 2/2013 | Hsu et al. | |
| 8,382,059 B2 | 2/2013 | Le Gette et al. | |
| D689,502 S | 9/2013 | Belitz et al. | |
| D690,305 S | 9/2013 | Wen | |
| 8,607,976 B2 | 12/2013 | Wu et al. | |
| 8,708,140 B2 | 4/2014 | Liu | |
| D707,229 S | 6/2014 | Almodova | |
| 8,746,449 B2 | 6/2014 | Gallagher et al. | |
| 8,763,795 B1 | 7/2014 | Oten et al. | |
| 8,800,763 B2 | 8/2014 | Hale | |
| D712,412 S | 9/2014 | Bleau et al. | |
| D712,413 S | 9/2014 | Fukai | |
| 8,887,902 B1 * | 11/2014 | Liu ..................... G06F 1/1628 |
| | | | 206/320 |
| D722,059 S | 2/2015 | Hirst | |
| D724,092 S | 3/2015 | Zangari et al. | |
| D729,810 S | 5/2015 | Klusener | |
| D733,150 S | 6/2015 | Sirichai | |
| D733,154 S | 6/2015 | Armstrong et al. | |
| 2007/0001079 A1 * | 1/2007 | Patterson, Jr. ......... A45C 11/00 |
| | | | 248/309.1 |
| 2007/0289188 A1 * | 12/2007 | Kohama ................ A47G 1/143 |
| | | | 40/754 |
| 2011/0290687 A1 | 12/2011 | Han | |
| 2012/0006950 A1 | 1/2012 | Vandiver | |
| 2012/0012483 A1 | 1/2012 | Fan | |
| 2012/0043247 A1 | 2/2012 | Westrup | |
| 2013/0241381 A1 | 9/2013 | Hynecek et al. | |
| 2014/0238876 A1 | 8/2014 | Chen et al. | |

OTHER PUBLICATIONS

International Search Report dated Apr. 5, 2016 in Int'l App. No. PCT/EP2015/079236, EPO as ISA, 6 pages.
Written Opinion dated Apr. 5, 2016 in Int'l App. No. PCT/EP2015/079236, EPO as ISA, 9 pages.
Tablet and Cell Phone Easel Stand, www.4AllPromos.com.
Basic Folding Smartphone and Tablet Stand, www.qualitylogoproducts.com.
Leather iPad 2 Case/Stand, www.4AllPromos.com.
Motion CL-Series Portfolio—509.400.02—Sleeve/Shuttle Notebook Cases, www.cdw.com.
Dell Premier Sleeve/Stand (M), www.dell.com.

* cited by examiner

TABLET COMPUTER CASE WITH DETACHABLE STAND

CROSS-REFERENCE TO RELATED APPLICATIONS

This application claims the benefit of the filing date of, and priority to, U.S. patent application No. 62/090,084, filed Dec. 10, 2014, the entire disclosure of which is hereby incorporated herein by reference.

This application is a continuation of U.S. patent application No. 29/538,610, filed Sep. 4, 2015, the entire disclosure of which is hereby incorporated herein by reference.

This application is a continuation of U.S. patent application No. 29/538,618, filed Sep. 4, 2015, the entire disclosure of which is hereby incorporated herein by reference.

This application is a continuation of U.S. patent application No. 29/538,622, filed Sep. 4, 2015, the entire disclosure of which is hereby incorporated herein by reference.

Each of U.S. patent application Nos. 29/538,610, 29/538,618, and 29/538,622 claims priority to each of Registered Community Design (RCD) application Nos. 001438840 and 002755637, filed Aug. 17, 2015, the entire disclosures of which are hereby incorporated herein by reference.

TECHNICAL FIELD

This disclosure relates in general to folios, or cases, for mobile electronic devices and, in particular, to a tablet computer case with a detachable stand.

BACKGROUND

The prevalence of mobile electronic devices has generated the need for products adapted to store, protect, and display the mobile electronic devices. A variety of products have been devised to meet this need, including folios or cases capable of enclosing a mobile electronic device and/or propping-up the mobile electronic device for hands-free viewing.

However, due to the proliferation of mobile electronic devices such as, for example, tablet computers of varying physical dimensions, there is a need among retailers to offer a case or folio product range capable of storing, protecting, and displaying as many different tablet computers as possible. Furthermore, there is a desire among consumers for a folio or case product range that includes a variety of colors and materials to choose from for any one particular tablet computer. Every product that is stocked by a retailer requires both a capital investment and physical space for housing the inventory. Additionally, each product is routinely assigned a stock keeping unit (SKU). Accordingly, significant amounts of record-keeping, capital investment, and physical space are required to maintain a product inventory capable of storing, protecting, and displaying a given variety of tablet computers. This creates an issue for retailers who wish to offer products capable of storing, protecting, and displaying a greater variety of tablet computers, especially those with limited record-keeping capabilities, physical space, and/or capital resources.

Therefore, what is needed is an apparatus, kit, retail display, method, assembly, or system that addresses one or more of the issues described above, and/or one or more other issues.

DETAILED DESCRIPTION

Figure 1:
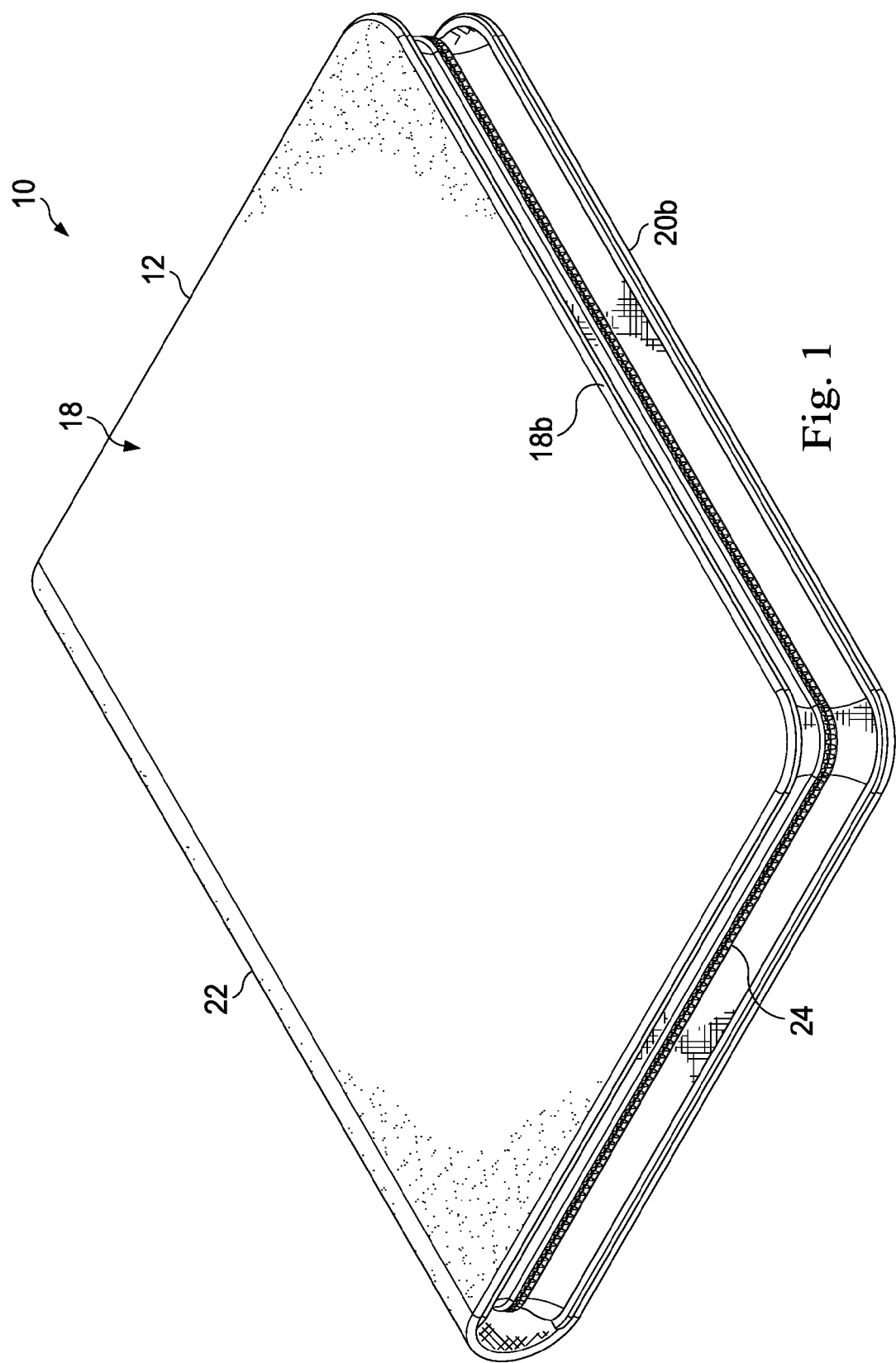
FIG. 1 is a perspective view of a tablet computer case with a detachable stand in a closed configuration, according to an exemplary embodiment.
Figure 2:
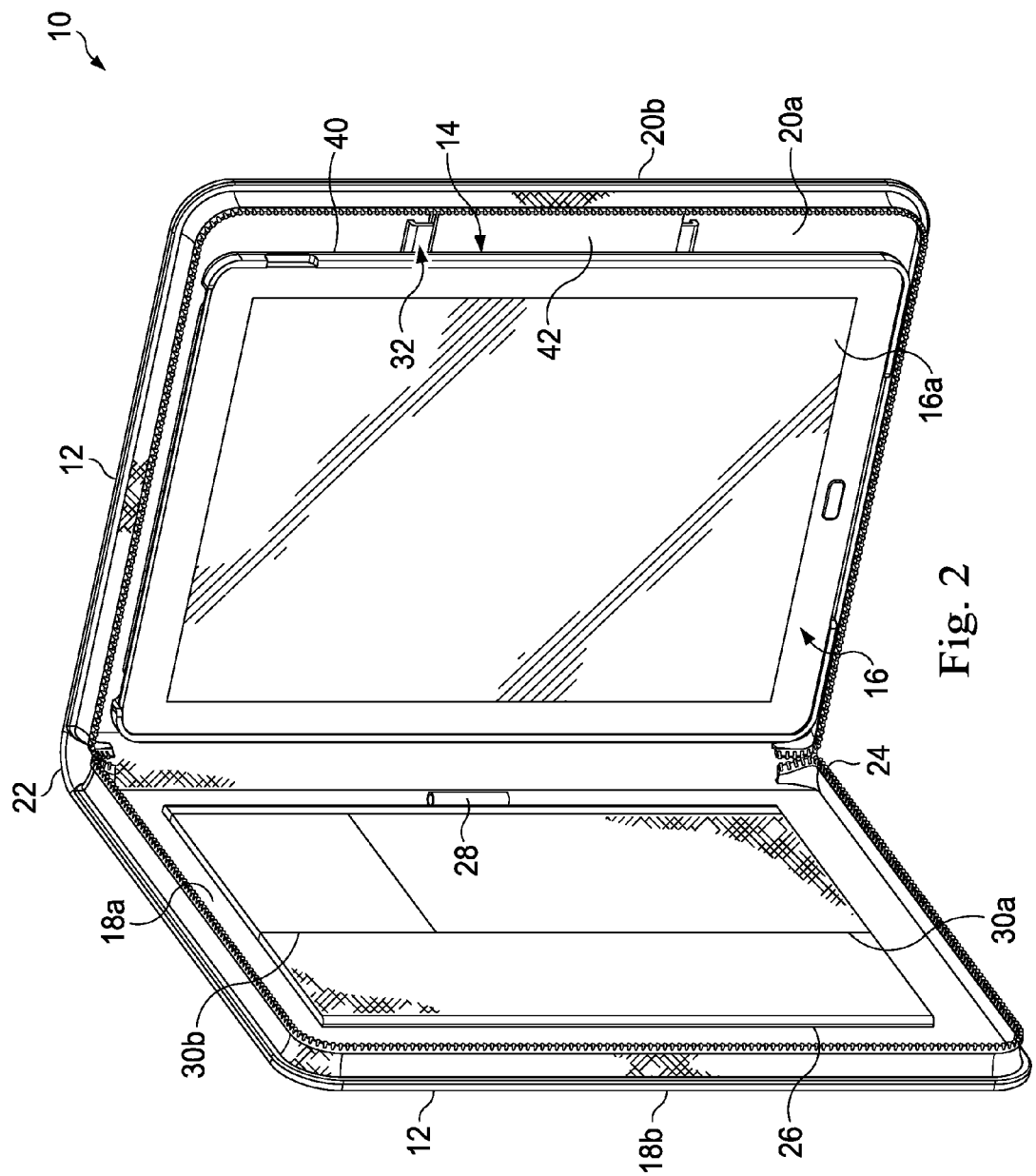
FIG. 2 is a front perspective view of the tablet computer case and the detachable stand of FIG. 1 in an open configuration, with the detachable stand supporting a tablet computer, according to an exemplary embodiment.
Figure 3:
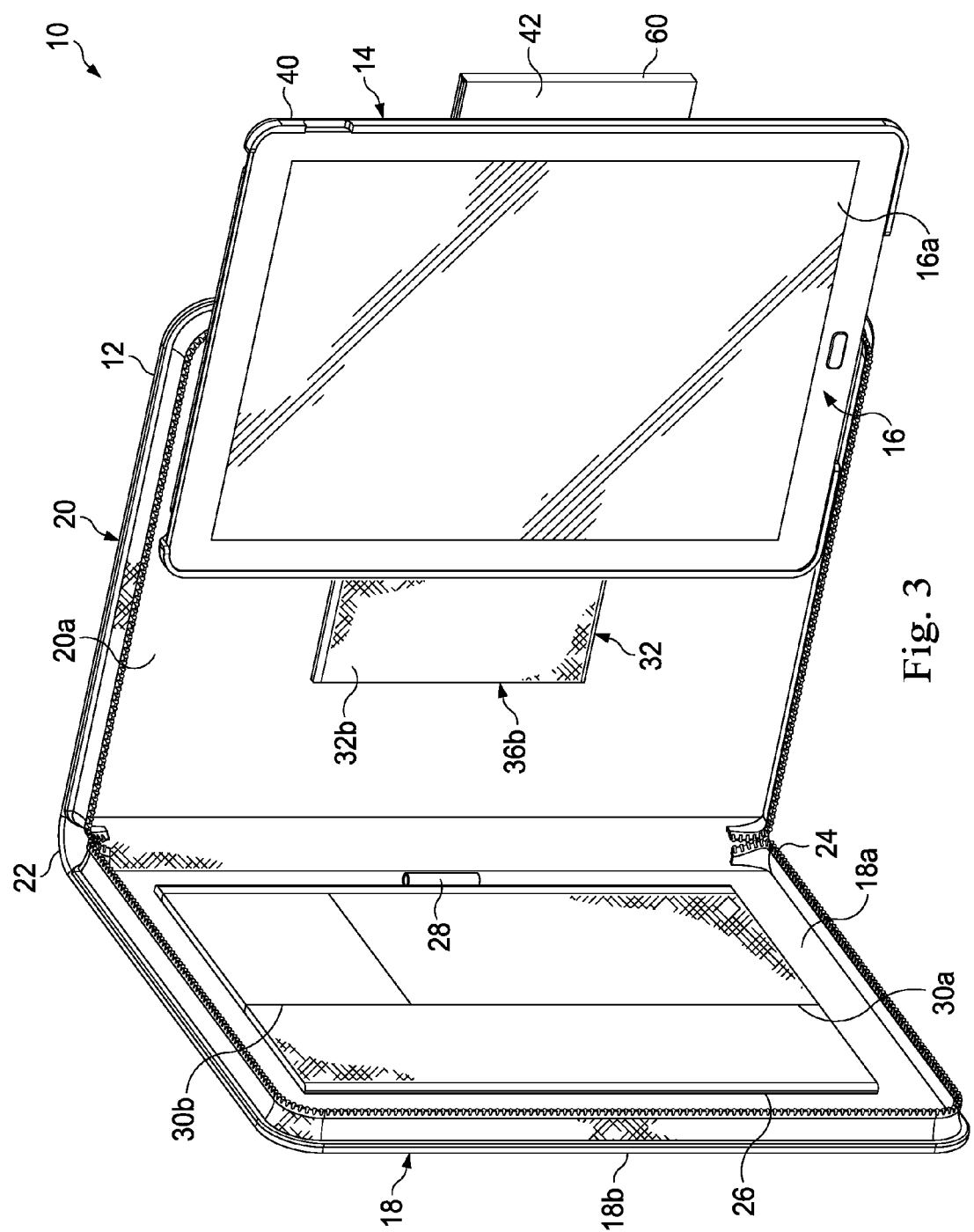
FIG. 3 is a front perspective view of the tablet computer case and the detachable stand of FIG. 2, the detachable stand being partially detached from the case, according to an exemplary embodiment.
Figure 4:
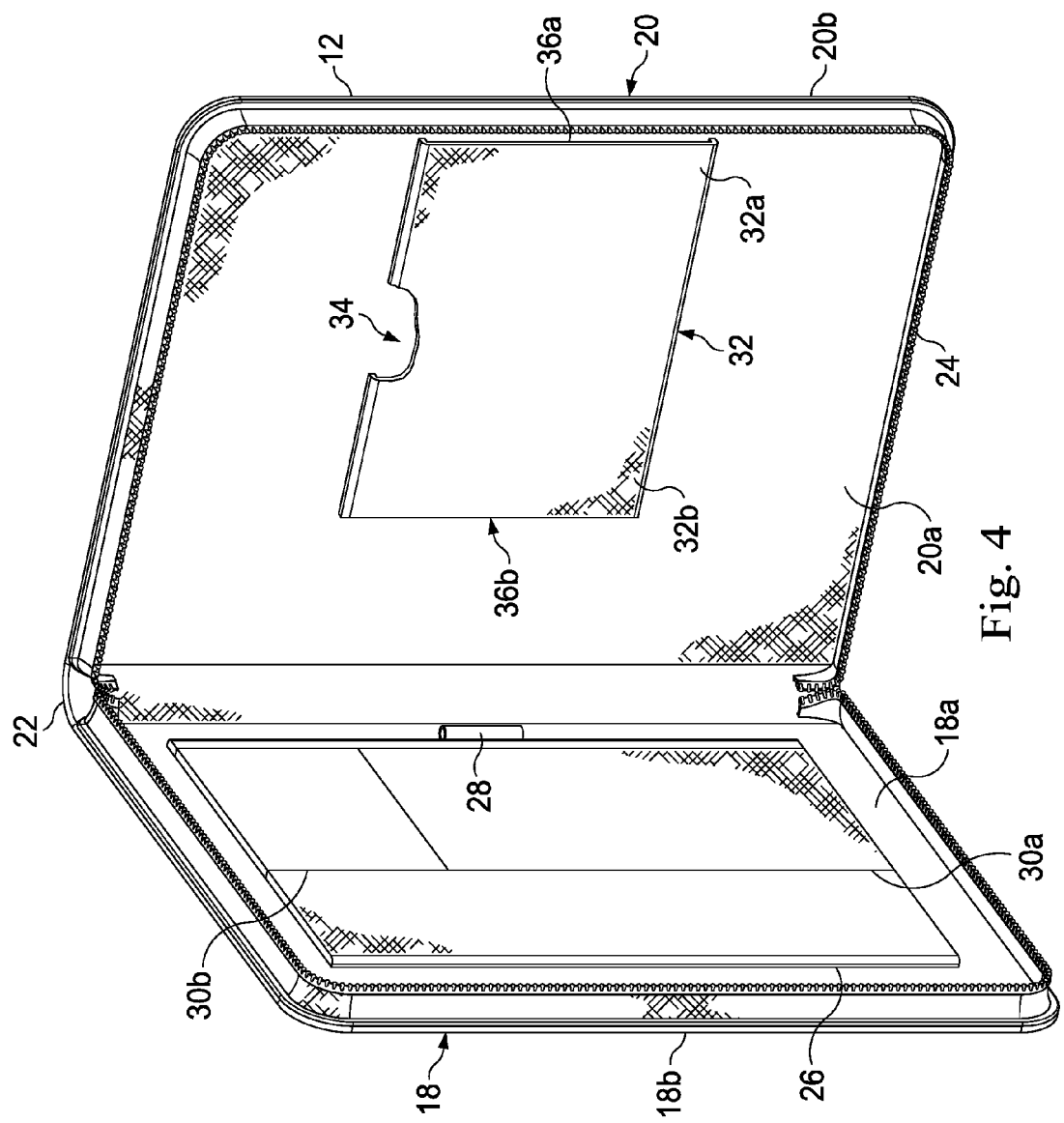
FIG. 4 is a front perspective view of the case of FIGS. 1-3 in an open configuration, according to an exemplary embodiment.

In an exemplary embodiment, as illustrated in FIGS. 1-4, an apparatus is generally referred to by the reference numeral 10 and includes a multifunctional folio or case 12 and a stand 14. As indicated in FIGS. 2-4, the stand 14 is adapted to be detachably coupled to the case 12. The detachability of the stand 14 from the case 12 will be described in further detail below. The stand 14 supports a mobile electronic device, such as, for example, a tablet computer 16 in a position so that a front face 16a thereof can be viewed and manipulated by a user while the tablet computer 16 is supported by the stand 14. Each of the apparatus 10, the case 12, and the stand 14 is adapted to support the tablet computer 16. In several exemplary embodiments, the tablet computer 16 is a commercially available tablet computer such as, for example, an Apple iPad®, an Apple iPad Mini®, a Samsung Galaxy Tab®, a Samsung Galaxy Note®, an Amazon Fire®, an Amazon Kindle Fire®, a Microsoft Surface®, or a Google Nexus®.

In an exemplary embodiment, as illustrated in FIG. 4 with continuing reference to FIGS. 1-3, the case 12 includes a front cover 18, a back cover 20, and a spine 22. The front cover 18 and the back cover 20 are substantially rectangular. In several exemplary embodiments, the front cover 18 and the back cover 20 may form any one of a number of substantially identical shapes such as, for example, rectangular shapes, circular shapes, triangular shapes, polygonal shapes, other planar shapes, or any combination thereof. The spine 22 connects the front cover 18 and the back cover 20, thereby allowing the case 12 to be placed in an open configuration, as shown in FIGS. 2-4, or a closed configuration, as shown in FIG. 1.

In the open configuration, as shown in FIGS. 2-4, the front cover 18 of the case 12 is not adapted to cover the front face 16a of the tablet computer 16. In the closed configuration, as shown in FIG. 1, the front cover 18 is spaced in a substantially parallel relation from the back cover 20, and is thereby adapted to cover the front face 16a of the tablet computer 16. A closure member 24 such as, for example, a zipper, secures the case 12 in the closed configuration by securing the front cover 18 to the back cover 20. In several exemplary embodiments, in addition to, or instead of, the zipper, the closure member 24 may include other types of closure members such as, for example, snaps, buttons, magnets, hook and loop fasteners, buckles, or any combination thereof. In several exemplary embodiments, when the case 12 is in the closed configuration shown in FIG. 1, the spine 22, the front cover 18, and the back cover 20 substantially cover the tablet computer 16, regardless of whether the closure member 24 is closed by being, for example, zipped up. In several exemplary embodiments, the closure member 24 is omitted from the apparatus 10 so that, when the case 12 is in the closed configuration, the spine 22, the front cover 18, and the back cover 20 substantially cover the tablet computer 16, covering at the least the front (including the front face 16a), the back, and a side of the tablet computer 16.

Referring still to FIGS. 1-4, the front cover 18 of the case 12 defines an inside surface 18a and an outer edge 18b opposing the spine 22. The back cover 20 of the case 12 defines an inside surface 20a and an outer edge 20b opposing the spine 22. The front cover 18 may have various pockets or other organizational components sewn into the inside surface 18a thereof, such as, for example, a document flap 26, a writing utensil holder 28, and miscellaneous elastomeric pockets 30a and 30b. A sleeve 32 is connected to the inside surface 20a of the back cover 20, thereby defining a retaining passage 34 between a pair of opposing end portions 32a and 32b of the sleeve 32 (a portion of the sleeve 32 is broken away in FIG. 4 to show the retaining passage 34). At the end portion 32a, the sleeve 32 forms an opening 36a, which provides access to the retaining passage 34. Similarly, at the end portion 32b, the sleeve 32 forms an opening 36b, which also provides access to the retaining passage 34. The sleeve 32 (and thus also the retaining passage 34) extends horizontally along at least a portion of the width of the inside surface 20a, and is positioned mid-way vertically along the length of the inside surface 20a of the back cover 20. Further, the position of the sleeve 32 is shifted horizontally, along the width of the inside surface 20a and towards the outer edge 20b of the back cover 20, so that the sleeve 32 is not positioned mid-way horizontally along, or along the width of, the inside surface 20a of the back cover 20.

In several exemplary embodiments, the inside surface 18a of the front cover 18 and the inside surface 20a of the back cover 20 may include any number of pockets or other organizational components in addition to those described above, such as, for example, holders, sleeves, pouches, pockets, flaps, accessory panels, or any combination thereof. Although an exemplary embodiment of the various pockets or other organizational components sewn into the inside surface 18a has been described above, any number of combinations may be utilized and connected to the inside surfaces 18a and/or 20a, with such combinations including the omission of one or more of the document flap 26, the writing utensil holder 28, and the elastomeric pockets 30a and 30b altogether.

Figure 5:
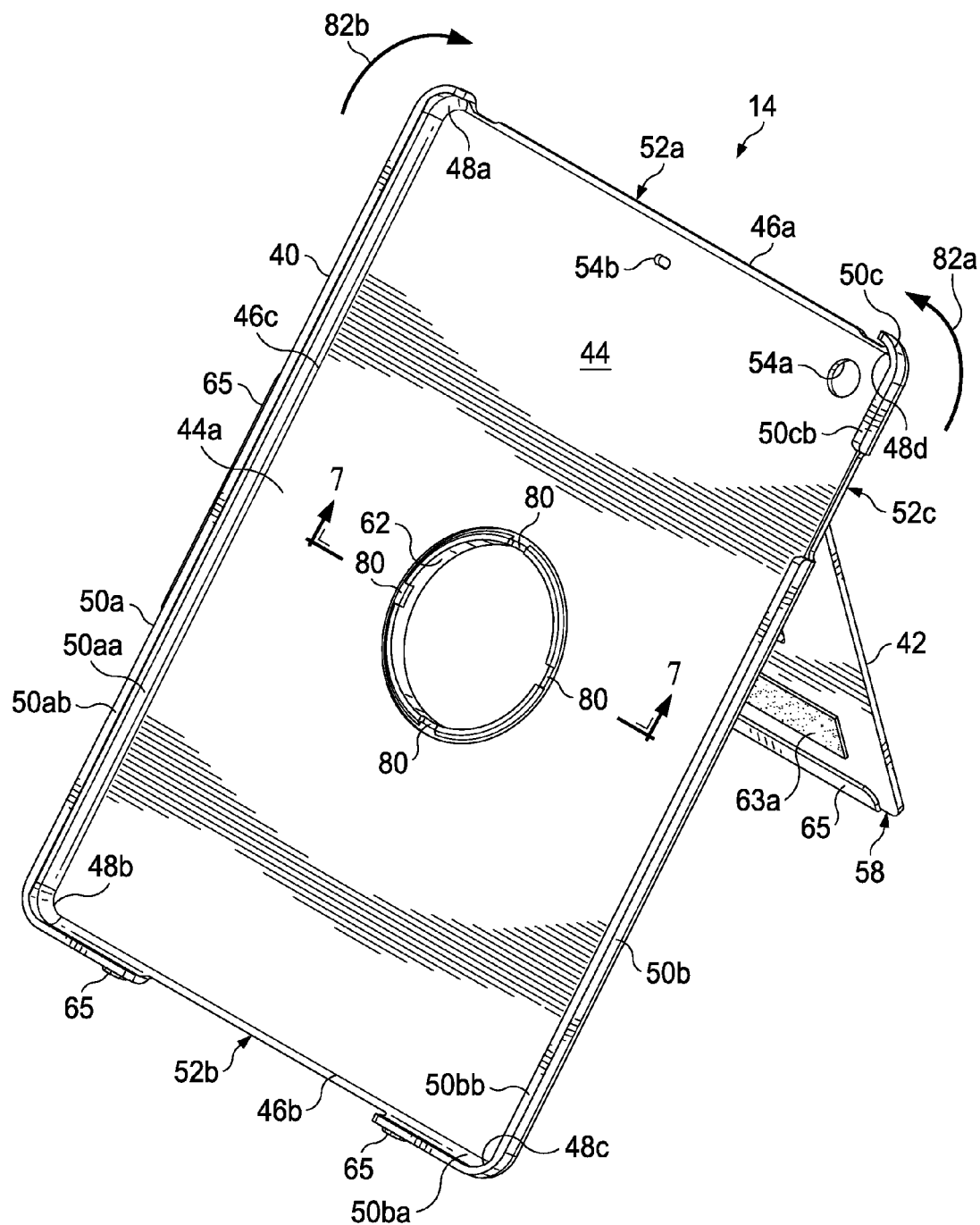
FIG. 5 is a front perspective view of the detachable stand of FIGS. 2 and 3 in a portrait viewing orientation, according to an exemplary embodiment.
Figure 6:
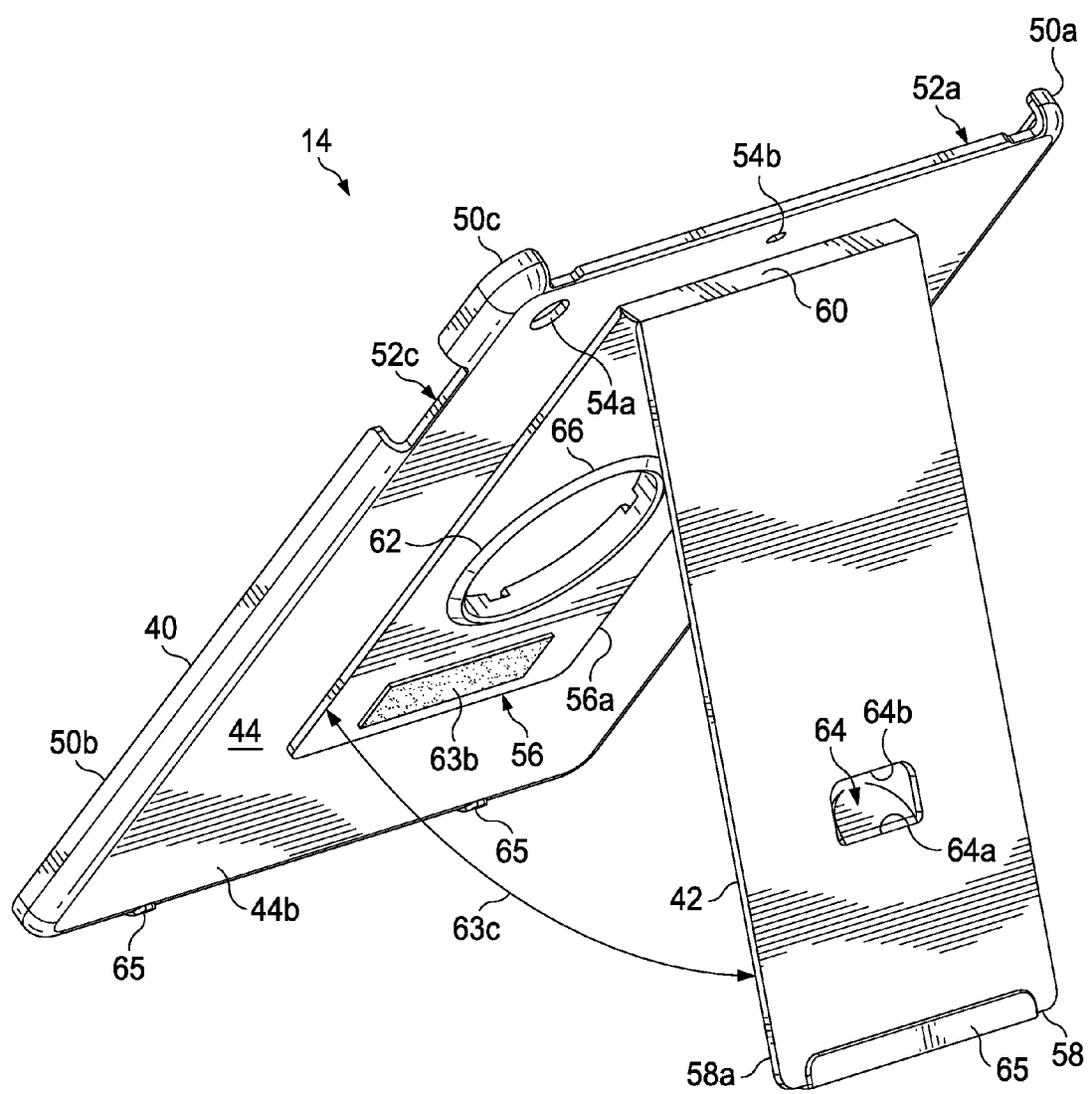
FIG. 6 is a rear perspective view of the detachable stand of FIG. 5, according to an exemplary embodiment.

Referring now to FIGS. 5 and 6, with continuing reference to FIGS. 1-4, an exemplary embodiment of the stand 14 is illustrated. The stand 14 includes a holder 40 and an arm 42 connected to the holder 40. The holder 40 is adapted to secure the tablet computer 16 to the stand 14. The tablet computer 16 is received within the holder 40 so that the tablet computer 16 is connected to the holder 40 while the front face 16a of the tablet computer 16 remains substantially open or uncovered (shown in FIG. 2). The holder 40 includes a body 44 defining a front surface 44a and a back surface 44b.

The body 44 of the holder 40 includes parallel-spaced edges 46a and 46b, and parallel-spaced edges 46c and 46d. A corner 48a is formed between the adjacent edges 46a and 46c. Further, a corner 48b is formed between the adjacent edges 46c and 46b. Further still, a corner 48c is formed between the adjacent edges 46b and 46d. Finally, a corner 48d is formed between the adjacent edges 46d and 46a. A wall 50a extends from the corner 48a, the edge 46c, the corner 48b, and a portion of the edge 46b. In an exemplary embodiment, the wall 50a is integrally formed with the corner 48a, the edge 46c, the corner 48b, and the edge 46b. The wall 50a extends from the front surface 44a, curving upwardly and defining a curved inside surface 50aa. A lip 50ab is formed at the distal end of the curved inside surface 50aa. A wall 50b extends from a portion of the edge 46b, the corner 48c, and a portion of the edge 46d. In an exemplary embodiment, the wall 50b is integrally formed with the edge 46b, the corner 48c, and the edge 46d. The wall 50b extends from the front surface 44a, curving upwardly and defining a curved inside surface 50ba. A lip 50bb is formed at the distal end of the curved inside surface 50ba. A wall 50c extends from a portion of the edge 46d and the corner 48d. In an exemplary embodiment, the wall 50b is integrally formed with the edge 46d and the corner 48d. The wall 50c extends from the front surface 44a, curving upwardly and defining a curved inside surface 50ca. A lip 50cb is formed at the distal end of the curved inside surface 50ca. A gap 52a is defined along the edge 46a and between the walls 50a and 50c. Further, a gap 52b is defined along the edge 46b and between the walls 50a and 50b. Further still, a gap 52c is defined along the edge 46d and between the walls 50b and 50c. Openings 54a and 54b are formed through the body 44.

When the tablet computer 16 is received by, and secured within, the holder 40, the curved inside surfaces 50aa, 50ba, and 50ca are adapted to accommodate respective sides of the tablet computer 16. In an exemplary embodiment, the walls 50a, 50b, and 50c flex to accommodate the respective sides of the tablet computer 16 as the tablet computer 16 is received within the holder 40, thus forming a friction fit and/or an interference fit with the tablet computer 16. The lips 50ab, 50bb, and 50cb snap into place over respective edges of the front face 16a of the tablet computer 16, thereby securing the tablet computer 16 within the holder 40. When the tablet computer 16 is so received by the holder 40 and secured therewithin, the tablet computer 16 engages, or is at least proximate, each of the circular opening 70 and the front surface 44a of the body 44; in several exemplary embodiments, the tablet computer 16 may be at least proximate each of the circular opening 70 and the front surface 44a when, for example: a gap is defined between the tablet computer 16 and each of the circular opening 70 and the front surface 44a; a layer or padding is disposed between the tablet computer 16 and each of the circular opening 70 and the front surface 44a; a cover, protrusion, coupler, or the like extends within and/or through the circular opening 70 and engages the tablet computer 16; or any combination thereof.

The gaps 52a, 52b, and 52c, and the openings 54a and 54b, provide access to various ports, buttons, switches, cameras, speakers, or other components or features of the tablet computer 16. In several exemplary embodiments, instead of, or in addition to, one or more of the walls 50a, 50b, and 50c, the holder 40 may include one or more other walls. In several exemplary embodiments, instead of, or in addition to, one or more of the gaps 52a, 52b, and 52c, the holder 40 may include one or more other gaps. In several exemplary embodiments, instead of, or in addition to, one or both of the openings 54a and 54b, the holder 40 may include one or more other openings formed through the body 44.

The arm 42 includes a coupling portion 56, a pivoting portion 58, and a hinge 60 that hingedly connects the coupling portion 56 to the pivoting portion 58. The coupling portion 56 of the arm 42 is rotatably coupled to the holder 40 by a coupling ring 62. The hinge 60 allows the pivoting portion 58 to pivot about the hinge 60 and relative to the coupling portion 56. A connector 63a is connected to an end portion 58a of the pivoting portion 58 that opposes the hinge 60. Similarly, a connector 63b is connected to an end portion 56a of the coupling portion 56 that opposes the hinge 60. The connectors 63a and 63b are adapted to be connected to each other. In an exemplary embodiment, the connectors 63a and 63b together form a hook and loop fastener. In several exemplary embodiments, in addition to, or instead of, a hook and loop fastener, the connectors 63a and 63b may include other types of connectors such as, for example, snaps, buttons, magnets, zippers, buckles, or any combination thereof.

Under conditions to be described below, the arm 42 may be alternately placed in a retracted position or in a deployed position. In the retracted position, the pivoting portion 58 and the coupling portion 56 are substantially parallel, and the connector 63a is connected to the connector 63b to maintain the arm 42 in the retracted position. The connectors 63a and 63b are adapted to cooperate with one another to secure the arm 42 in the retracted position. In the deployed position, the pivoting portion 58 is pivoted outwardly away from the holder 40, about the hinge 60 and relative to the coupling portion 56, so that an angle 63c greater than zero degrees is defined between the portions 56 and 58. The pivoting portion 58 is thus capable of pivoting about the hinge 60 and relative to the coupling portion 56 to any number of orientations, including an orientation in which the pivoting portion 58 is capable of supporting the holder 40 in an easel-like fashion.

A tab 64 is formed in the pivoting portion 58 of the arm 42. The tab 64 defines an edge portion 64a along which the tab 64 is hingedly connected to the pivoting portion 58. Moreover, the hinged connection of tab 64 is angularly biased or otherwise configured so that: the tab 64 extends angularly from the pivoting portion 58 in the general direction of the hinge 60; the distal end of the tab 64 is positioned between the pivoting portion 58 and the coupling portion 56 of the arm; and an angle of greater than zero degrees is defined between the tab 64 and the pivoting portion 58. As a result, when the stand 14 is detachably coupled to the case 12, the tab 64 is adapted to hook to, or otherwise engage, the sleeve 32 adjacent the opening 36b thereof, as will be discussed in further detail below.

An opening 64b is formed through the pivoting portion 58 of the arm 42 and positioned, relative to the tab 64, so that at least a portion of the tab 64 extends within the opening 64b when the angular biasing of the tab 64 is overcome and the tab 64 is coplanar, or nearly coplanar, with the pivoting portion 58. As a result, in several exemplary embodiments, when the tab 64 is engaged by a component of the case 12 or the stand 14, the tab 64 is adapted to flex against the angular biasing of the tab 64 so that the angle between the tab 64 and the pivoting portion 58 decreases; in several exemplary embodiments, this angle decreases so that the tab 64 is coplanar, or nearly coplanar, with the pivoting portion 58 and at least a portion of the tab 64 extends within the opening 64b. Moreover, once the tab 64 is no longer engaged by a component of the case 12 or the stand 14, the tab 64 is adapted to return to its original angular position relative to the pivoting portion 58.

In several exemplary embodiments, as shown in FIGS. 5 and 6, a shoe, boot, or stopper 65 is connected to the end portion 58a of the pivoting portion 58. The stopper 65 that is connected to the end portion 58a is centered on, extends along, the majority of the edge of the end portion 58a. Further, in several exemplary embodiments, as shown in FIG. 5, two shoes, boots, or stoppers 65 are also connected to the walls 50a and 50b, respectively, along the edge 46b. The respective stoppers 65 are positioned proximate the gap 52b so that the gap 52b is positioned between the two stoppers 65 along the edge 46b. The respective stoppers 65 connected to the walls 50a and 50b are smaller in size than the stopper 65 that is connected to the end portion 58a. Further still, in several exemplary embodiments, as shown in FIG. 5 a shoes, boot, or stopper 65 is also connected to the wall 50a along the edge 46c. The stopper 65 that is connected to the wall 50a is centered on the edge 46c. Each of the foregoing shoes, boots, or stoppers 65 is adapted to grip or better engage any horizontal surface on which the stand 14 rests. In several exemplary embodiments, each of the foregoing shoes, boots, or stoppers 65 is composed of one or more materials adapted to grip or better engage any horizontal surface on which the stand 14 rests; examples of such one or more materials include rubber, one or more elastomers, one or more plastic materials, or any combination thereof.

Figure 7:
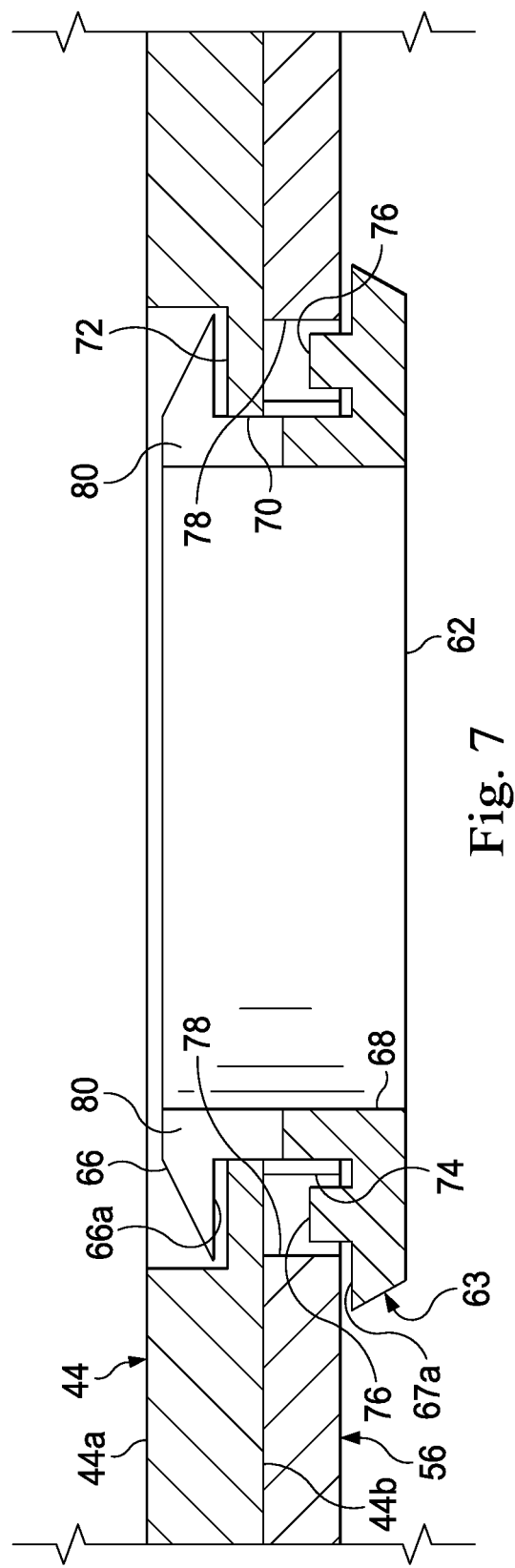
FIG. 7 is a sectional view of the detachable stand of FIG. 5 taken along line 7-7 of FIG. 5, according to an exemplary embodiment.

Referring to FIG. 7, with continuing reference to FIGS. 5 and 6, an exemplary embodiment of the coupling ring 62 is illustrated. The coupling ring 62 includes a top flange 66 and a bottom flange 67 spaced in a parallel relation therefrom. An annular portion 68 extends between the parallel-spaced flanges 66 and 67. The top flange 66 and the bottom flange 67 are attached to and extend circumferentially about opposing ends of the annular portion 68. An opening, such as a circular opening 70, is formed through the body 44 of the holder 40 and extends from the front surface 44*a* to the back surface 44*b*. The circular opening 70 defines a rim 72 of the body 44. The rim 72 is offset below the front surface 44*a* of the body 44 and extends circumferentially around the circular opening 70. A circular opening 74 is also formed through the coupling portion 56. The circular opening 74 and the circular opening 70 are concentrically aligned with one another so that the coupling portion 56 contacts, or nearly contacts, the back surface 44*b* of the body 44. The annular portion 68 of the coupling ring 62 fits concentrically within both of the circular openings 70 and 74 at once. The rim 72 and the coupling portion 56, both being concentrically disposed about the annular portion 68, are held together by the top flange 66 and the bottom flange 67 of the coupling ring 62. In this position, the coupling portion 56 contacts, or nearly contacts, an inner face 67*a* of the bottom flange 67. Additionally, the rim 72 contacts, or nearly contacts, an inner face 66*a* of the top flange 66. As a result, the top flange 66 is either flush with or offset below the front surface 44*a* of the body 44. With the coupling ring 62 installed, the coupling portion 56 is capable of relative 360-degree rotation with respect to the body 44 (and vice versa) using at least the circular opening 70 and the coupling ring 62.

In an exemplary embodiment, a plurality of protrusions 76 and corresponding notches 78 are adapted to prevent, or at least obstruct or resist to some degree, relative rotation between the coupling ring 62 and the coupling portion 56. More particularly, the protrusions 76 extend from the inner face 67*a* of the bottom flange 67. The protrusions 76 are circumferentially spaced from one another. The corresponding notches 78 are formed through the coupling portion 56 along the circumference of, and adjacent to, the circular opening 74. The protrusions 76 fit within the corresponding notches 78, thereby acting to prevent, or at least obstruct or resist to some degree, relative rotation between the coupling ring 62 and the coupling portion 56.

As the coupling portion 56 is rotated relative to the body 44, the protrusions 76 are maintained within the notches 78, causing the coupling ring 62 to rotate along with the coupling portion 56 and relative to the body 44. Conversely, as the body 44 is rotated relative to the coupling portion 56, the protrusions 76 are maintained within the notches 78, causing the body 44 to rotate relative to each of the coupling ring 62 and the coupling portion 56. Additionally, in several exemplary embodiments, a friction fit may be formed between the rim 72 and the annular portion 68. Relative rotation between the coupling ring 62 and the body 44 is resisted by the friction fit. The friction fit thus maintains the orientation of the body 44 with respect to the coupling portion 56 until a threshold force is applied, which induces relative rotation between the body 44 and the coupling portion 56. In several exemplary embodiments, as shown in FIG. 5, circumferentially-spaced notches 80 are formed in the top flange 66 and the annular portion 68. The circumferential location of each of the notches 80 corresponds to the circumferential location of a respective one of the protrusions 76.

In several exemplary embodiments, instead of, or in addition to, the tab 64, a circular opening (not shown) is formed in the pivoting portion 58 of the arm 42. The circular opening is adapted to accommodate the bottom flange 67 when the arm 42 is placed in the retracted position; that is, the bottom flange 67 extends within the circular opening when the arm 42 is in the retracted position.

Figure 8:
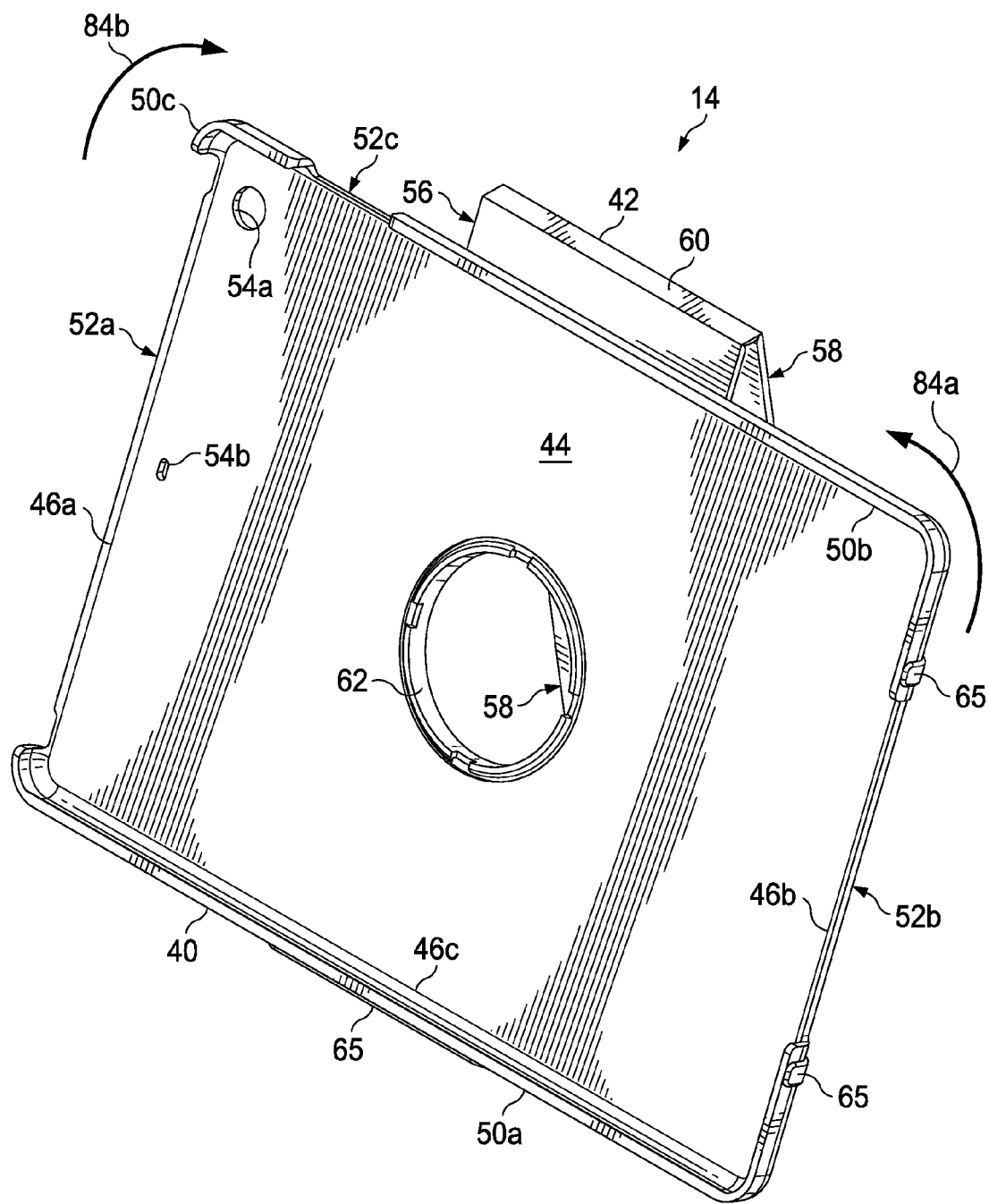
FIG. 8 is a front perspective view of the detachable stand of FIG. 5 in a landscape viewing orientation, according to an exemplary embodiment.
Figure 9:
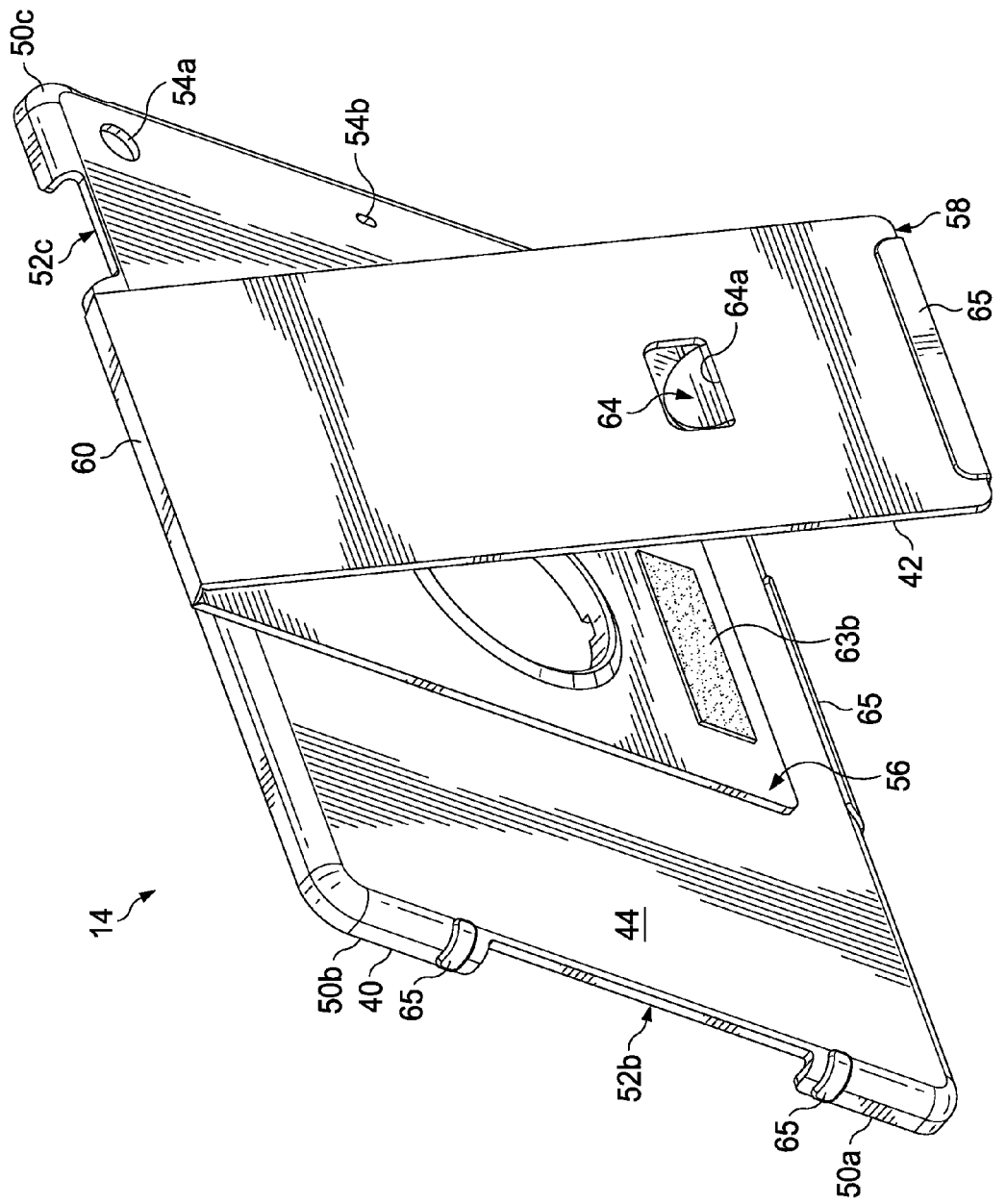
FIG. 9 is a rear perspective view of the detachable stand of FIG. 8, according to an exemplary embodiment.

Referring again to FIGS. 5 and 6 with additional reference to FIGS. 8 and 9, any number of viewing orientations can be achieved by rotating, using at least the circular opening 70 and the coupling ring 62, the coupling portion 56 relative to the body 44 (or vice versa), including, for example, a portrait viewing orientation, as shown in FIGS. 5 and 6, and a landscape viewing orientation, as shown in FIGS. 8 and 9. In the portrait viewing orientation, as shown in FIGS. 5 and 6, the edge 46*b*, or alternatively the edge 46*a*, of the body 44 is positioned horizontally on a substantially horizontal surface. The coupling portion 56 is rotated with respect to the body 44 (or vice versa), using at least the circular opening 70 and the coupling ring 62, so that the pivoting portion 58 of the arm 42 is substantially vertical when the edge 46*a* or 46*b* is positioned on the substantially horizontal surface. The pivoting portion 58 is then swung outwardly about the hinge 60 to support the holder 40 in the portrait viewing orientation in an easel-like fashion. In several exemplary embodiments, the two shoes, boots, or stoppers 65 connected to the walls 50*a* and 50*b*, respectively, along the edge 46*b*, as well as the stopper 65 connected to the end portion 58*a* of the pivoting portion 58, grip or better engage the horizontal surface on which the stand 14 rests. As a result, the shoes, boots, or stoppers 65 enable the arm 42 to support the holder 40 in the portrait orientation without slipping relative to the horizontal surface on which the stand 14 rests.

In the landscape viewing orientation, as shown in FIGS. 8 and 9, the edge 46*c*, or alternatively the edge 46*d*, of the body 44 is positioned horizontally on a substantially horizontal surface. The coupling portion 56 is rotated with respect to the body 44 (or vice versa), using at least the circular opening and the coupling ring 62, so that the pivoting portion 58 of the arm 42 is substantially vertical when the edge 46*c* or 46*d* is positioned on the substantially horizontal surface. The pivoting portion 58 is then swung outwardly about the hinge 60 to support the holder 40 in the landscape viewing orientation in an easel-like fashion. In several exemplary embodiments, the shoe, boot, or stopper 65 connected to the wall 50*a* along the edge 46*c*, as well as the stopper 65 connected to the end portion 58*a* of the pivoting portion 58, grip or better engage the horizontal surface on which the stand 14 rests. As a result, the shoes, boots, or stoppers 65 enable the arm 42 to support the holder 40 in the landscape orientation without slipping relative to the horizontal surface on which the stand 14 rests.

In several exemplary embodiments, directions of rotation of the body 44 relative to the coupling portion 56 of the arm 42 (or vice versa) to change the holder 40 from the portrait viewing orientation shown in FIGS. 5 and 6 to the landscape viewing orientation shown in FIGS. 8 and 9, are indicated by arrows 82*a* and 82*b* in FIG. 5. For another example, directions of rotation of the body 44 relative to the coupling portion 56 of the arm 42 (or vice versa), to change the holder 40 from the landscape viewing orientation shown in FIGS.

8 and 9 to the portrait viewing orientation shown in FIGS. 5 and 6, are indicated by arrows 84a and 84b in FIG. 8.

Figure 10:
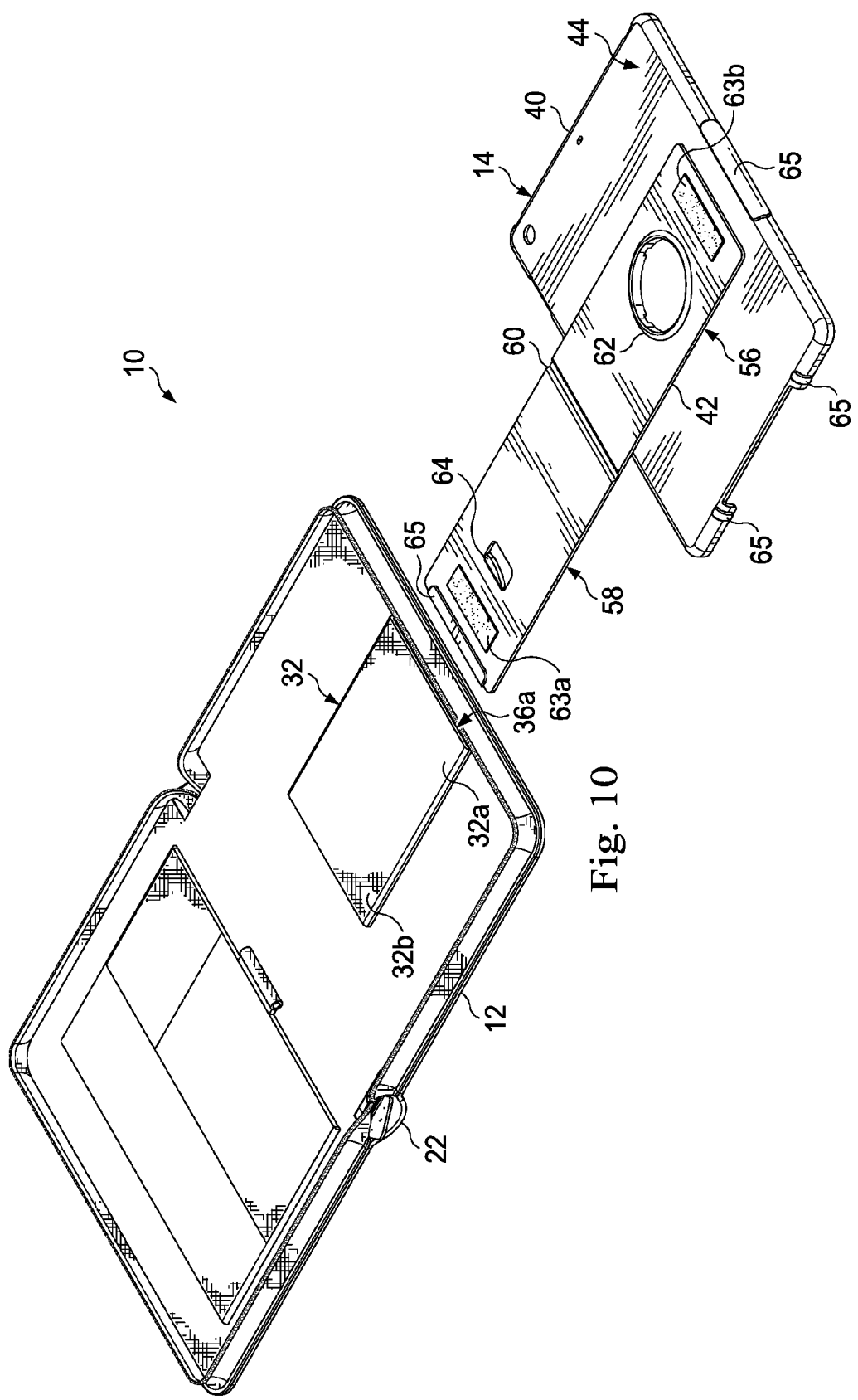
FIG. 10 is a perspective view of the case and detachable stand of FIGS. 1-9, according to an exemplary embodiment.
Figure 11:
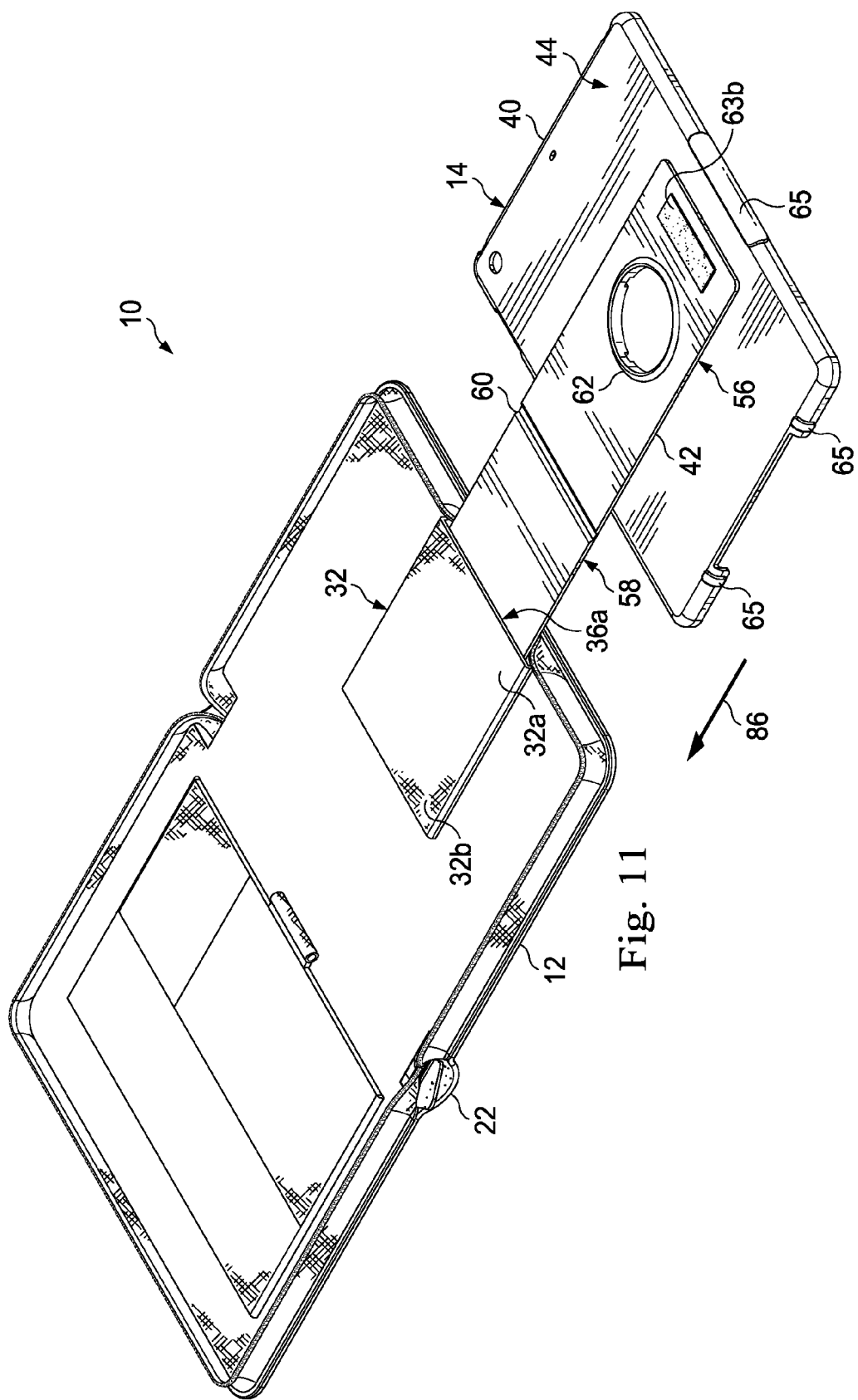
FIG. 11 is a perspective view of the case and detachable stand of FIG. 10, the detachable stand in the process of being detachably coupled to the case, according to an exemplary embodiment.

In an exemplary embodiment, as illustrated in FIGS. 10-13 with continuing reference to FIGS. 1-9, the stand 14 is capable of being detachably coupled to the case 12. To detachably couple the stand 14 to the case 12, the arm 42 is first placed in the deployed position, as shown in FIG. 10. The end portion 58a and, subsequently, the tab 64 of the pivoting portion 58 are then introduced into the opening 36a formed by the sleeve 32, as shown in FIG. 11 and indicated by arrow 86, so that the retaining passage 34 receives the pivoting portion 58. In several exemplary embodiments, when the tab 64 is introduced into the opening 36a, the engagement between the tab 64 and the sleeve 32 causes the tab 64 to flex so that the angle between the tab 64 and the pivoting portion 58 decreases. In several exemplary embodiments, when the tab 64 is introduced into the opening 36a, the engagement between the tab 64 and the sleeve 32 causes the tab 64 to flex, overcoming the angular biasing of the tab 64 so that the angle between the tab 64 and the pivoting portion 58 decreases and both the pivoting portion 58 and the tab 64 are inserted into the retaining passage 34.

Figure 12:
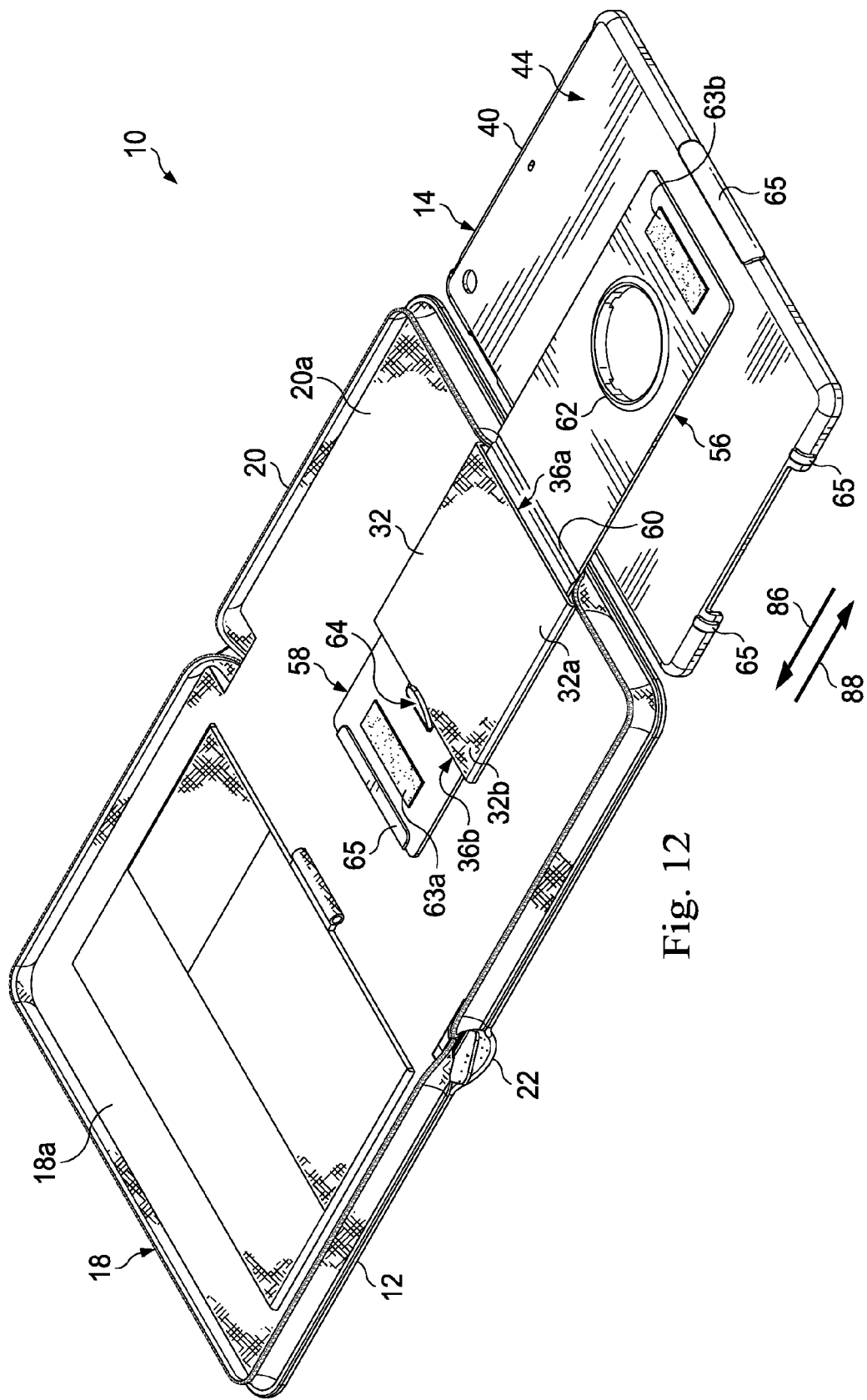
FIG. 12 is a perspective view of the case and detachable stand of FIG. 11, the detachable stand being detachably coupled to the case, and a portion of the detachable stand being in a pivot position relative to the case, according to an exemplary embodiment.

As shown in FIG. 12 and indicated by the arrow 86, the pivoting portion 58 is fed into the opening 36a and through the retaining passage 34, until the end portion 58a and the tab 64 protrude out of the opening 36b formed by the sleeve 32. In several exemplary embodiments, once the tab 64 clears the sleeve 32 adjacent the opening 36b, the angular biasing of the tab 64 causes the tab 64 to return to its original angular position relative to the pivoting portion 58. At this position, the tab 64 either is proximate, or engages, the end portion 32b of the sleeve 32. At this position, in several exemplary embodiments, the stand 14 is detachably coupled to the case 12, with the combination of the sleeve 32, as well as the engagement between the tab 64 and the end portion 32b, securing the stand 14 to the case 12. In several exemplary embodiments, when the pivoting portion 58 is displaced in a direction indicated by the arrow 88 and relative to the case 12, the tab 64 hooks to or otherwise engages, or further engages, the sleeve 32 at the end portion 32b thereof and adjacent the opening 36b, thereby retaining the pivoting portion 58 within the sleeve 32.

In several exemplary embodiments, the tab 64 is omitted from the stand 14 and the stand 14 is detachably coupled to the case 12 when the pivoting portion 58 extends through the retaining passage 34, with the sleeve 32 securing the stand 14 to the case 12. In several exemplary embodiments, the tab 64 is omitted from the stand 14 and the stand 14 is detachably coupled to the case 12 when the pivoting portion 58 extends at least partially within the retaining passage 34, with the sleeve 32 securing the stand 14 to the case 12.

Figure 13:
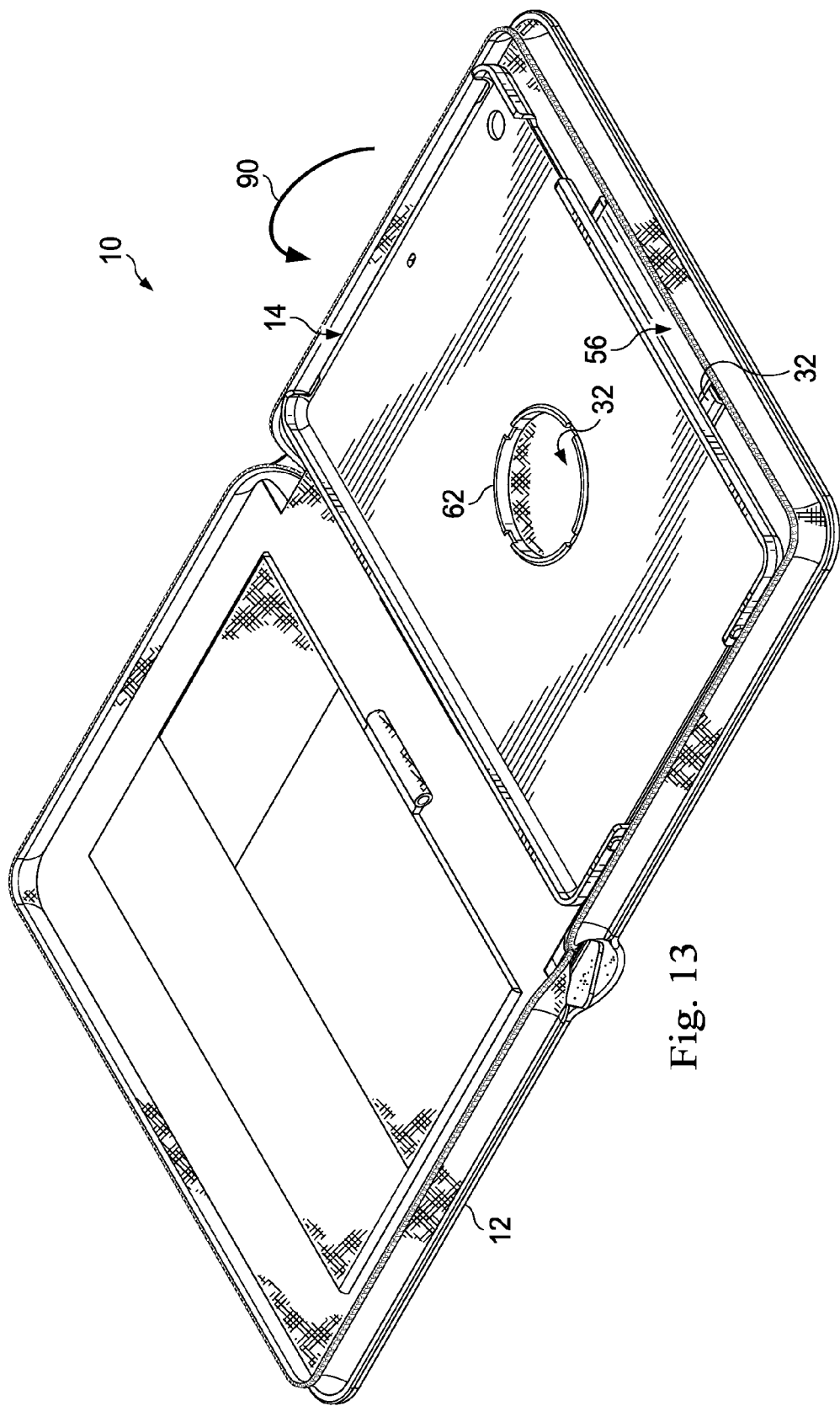
FIG. 13 is a perspective view of the case and detachable stand of FIGS. 1-9, the portion of the detachable stand of FIG. 12 being in another pivot position relative to the case, according to an exemplary embodiment.

As shown in FIG. 13, once the stand 14 has been detachably coupled to the case 12, the coupling portion 56 and the holder 40 are capable of pivoting about the hinge 60 and relative to each of the pivoting portion 58, the sleeve 32, and the back cover 20 of the case 12. As a result, the coupling portion 56 and the holder 40 pivot towards pivoting portion 58, as indicated by arrow 90 in FIG. 13. Further, the arm 42 is secured in the retracted position while the stand 14 is detachably coupled to the case 12 by connecting the connectors 63b to the connector 63a.

In several exemplary embodiments, the stand 14 may be detached from the case 12 by performing the foregoing steps in reverse. More particularly, the holder 40 may be pivoted about the hinge 60 in a direction opposite that indicated by the arrow 90 in FIG. 13, thereby disconnecting the connector 63b from the connector 63a. The pivoting portion 58 of the holder 40 may then be removed from the retaining passage 34 defined by the sleeve 32. Specifically, the pivoting portion 58 and thus the holder 40 may be so removed by first pressing the tab 64 so that the tab 64 flexes and the angle between the tab 64 and the pivoting portion 58 decreases; in several exemplary embodiments, this angle decreases until at least a portion of the tab 64 extends within the opening 64b and the tab 64 is coplanar, or nearly coplanar, with the pivoting portion 58. When the tab 64 is so pressed, the holder 40 may then be removed by pulling the holder 40 in a direction indicated by the arrow 88 in FIG. 12, allowing the tab 64 to be fed through the retaining passage 34 of the sleeve 32. The pivoting portion 58 is pulled out of the retaining passage 34 until the end portion 58a is removed from the opening 36a. In this position, in several exemplary embodiments, the stand 14 may be considered to be detached from the case 12.

In an exemplary embodiment, as the stand 14 is being detachably coupled to the case 12 as indicated by the arrow 86 in FIG. 12, the pivoting portion 58 may be pivoted to any number of orientations, as long as the connectors 63a, 63b are not connected to one another, including an orientation in which the angle 63c (FIG. 6) between the portions 56 and 58 is relatively small. In an exemplary embodiment, as the stand 14 is being removed from the case 12 as indicated by the arrow 88 in FIG. 12, the pivoting portion 58 may be pivoted to any number of orientations, as long as the connectors 63a, 63b are not connected to one another, including an orientation in which the angle 63c (FIG. 6) between the portions 56 and 58 is relatively small.

Figure 14:
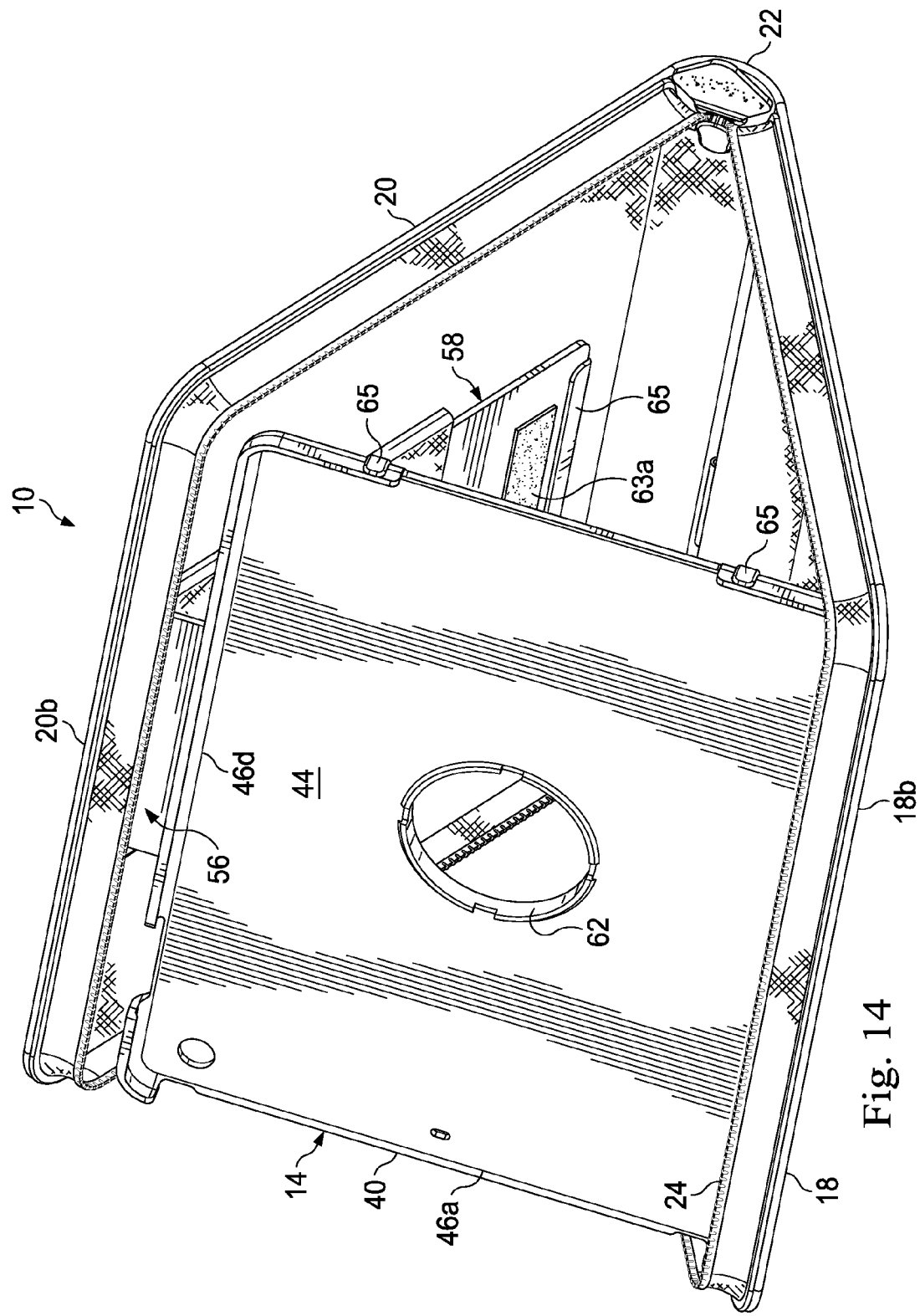
FIG. 14 is a perspective view of the case and detachable stand of FIGS. 1-9, the case and detachable stand being detachably coupled, the case being in an open configuration, and the stand being propped up in a landscape viewing orientation, according to an exemplary embodiment.
Figure 15:
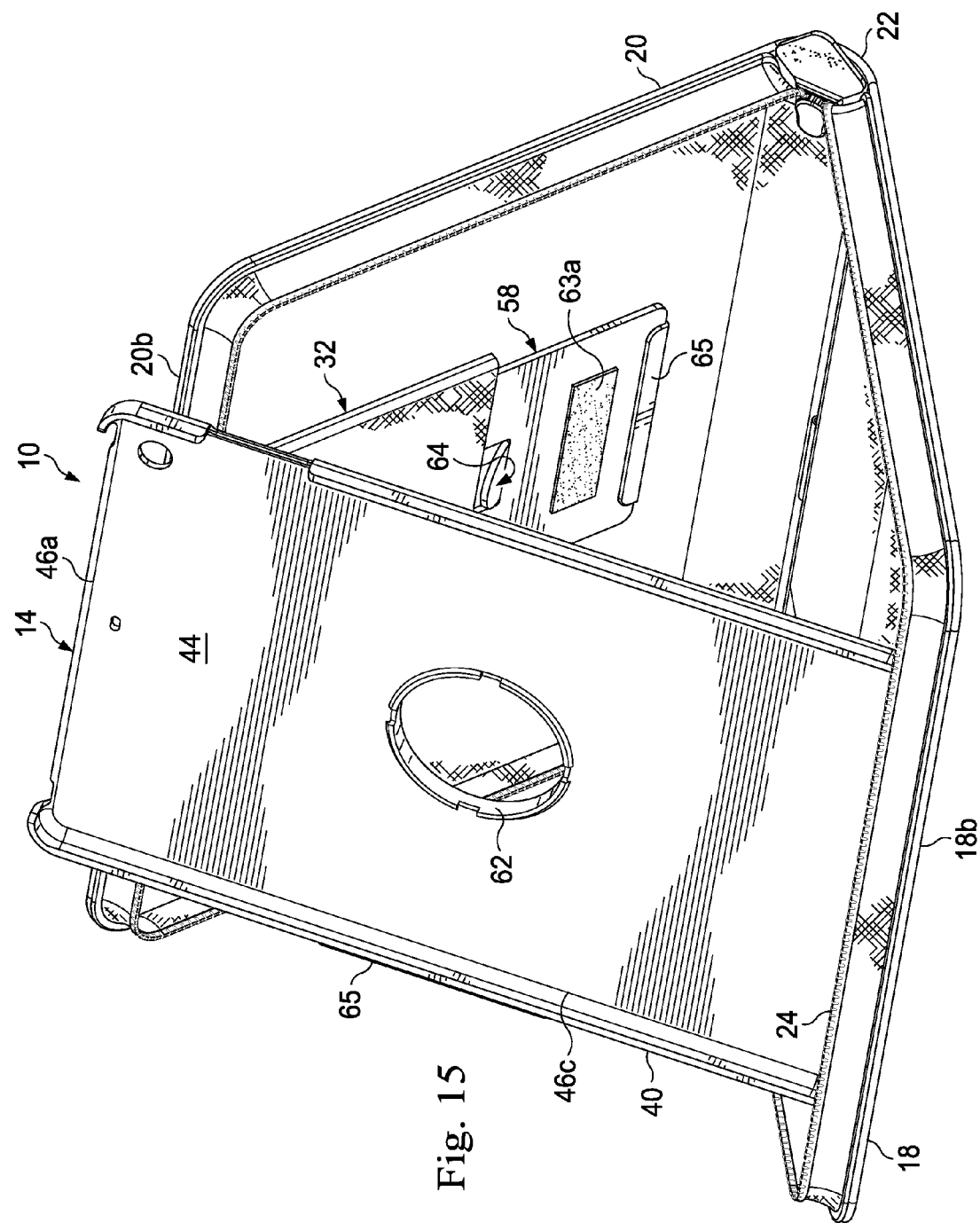
FIG. 15 is a perspective view of the case and detachable stand of FIGS. 1-9, the case and detachable stand being detachably coupled, the case being in an open configuration, and the stand being propped up in a portrait viewing orientation, according to an exemplary embodiment.

In an exemplary embodiment, as illustrated in FIGS. 14 and 15, once the stand 14 has been detachably coupled to the case 12, the case 12 may be in an open configuration and support the stand 14 in a propped-up position, thereby exhibiting any number of viewing orientations such as, for example, a landscape viewing orientation, as shown in FIG. 14, and a portrait viewing orientation, as shown in FIG. 15. In the landscape viewing orientation, as shown in FIG. 14, the body 44 is rotated relative to the coupling portion 56 so that the edges 46c and 46d of the body 44 are substantially parallel with the respective outer edges 18b and 20b of the front cover 18 and the back cover 20. In the portrait viewing orientation, as shown in FIG. 15, the body 44 is rotated relative to the coupling portion 56 so that the edges 46a and 46b are substantially parallel with the respective outer edges 18b and 20b of the front cover 18 and the back cover 20. These relative rotations are carried out using at least the circular opening 70 and the coupling ring 62, with a portion of the coupling ring 62 extending within the circular opening 70, as described above.

Figure 16:
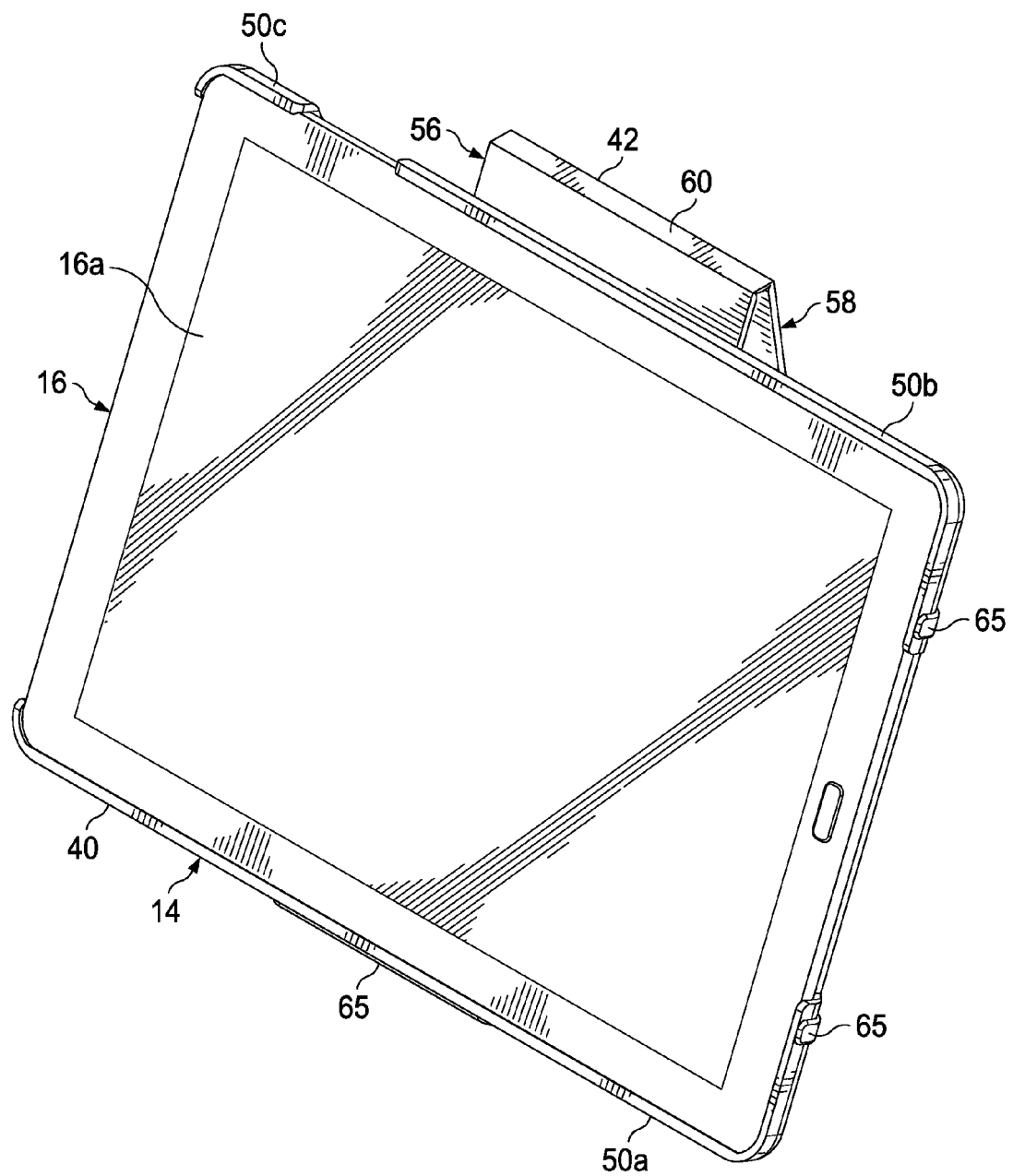
FIG. 16 is a front perspective view similar to that of FIG. 8, with the detachable stand supporting the tablet computer in a landscape viewing orientation, according to an exemplary embodiment.

In an exemplary embodiment, as shown in FIG. 16, the tablet computer 16 may be supported in a stand-alone configuration and in an easel-like fashion, with the stand 14 detached from the case 12 and placed in a landscape orientation. In several exemplary embodiments, the shoes, boots, or stoppers 65 connected to the wall 50a along the edge 46c, as well as to the end portion 58a of the pivoting portion 58, grip or better engage the horizontal surface on which the stand 14 rests. As a result, the shoes, boots, or stoppers 65 enable the arm 42 to support the holder 40 in the landscape orientation without slipping relative to the horizontal surface on which the stand 14 rests. In several exemplary embodiments, the stand 14 does not include the arm 42 and thus the stand 14 supports the tablet computer 16 in a non-easel-like fashion by the engagement of the back surface 44b of the holder 44 with, for example, either a horizontal surface (such as a tabletop surface) in the landscape orientation, or both a book and the horizontal surface so that the tablet computer 16 extends angularly to facilitate the viewing thereof in the landscape orientation. In several exemplary embodiments, the stand 14 supports the table computer 16 in a non-easel-like fashion when the arm 42 is in retracted position, by the engagement of the back surface 44b and/or the arm 42 with, for example, either a horizontal surface (such as a tabletop surface) in the landscape orientation, or both a book and the horizontal surface so that the tablet computer 16 extends angularly to facilitate the viewing thereof in the landscape orientation.

Figure 17:
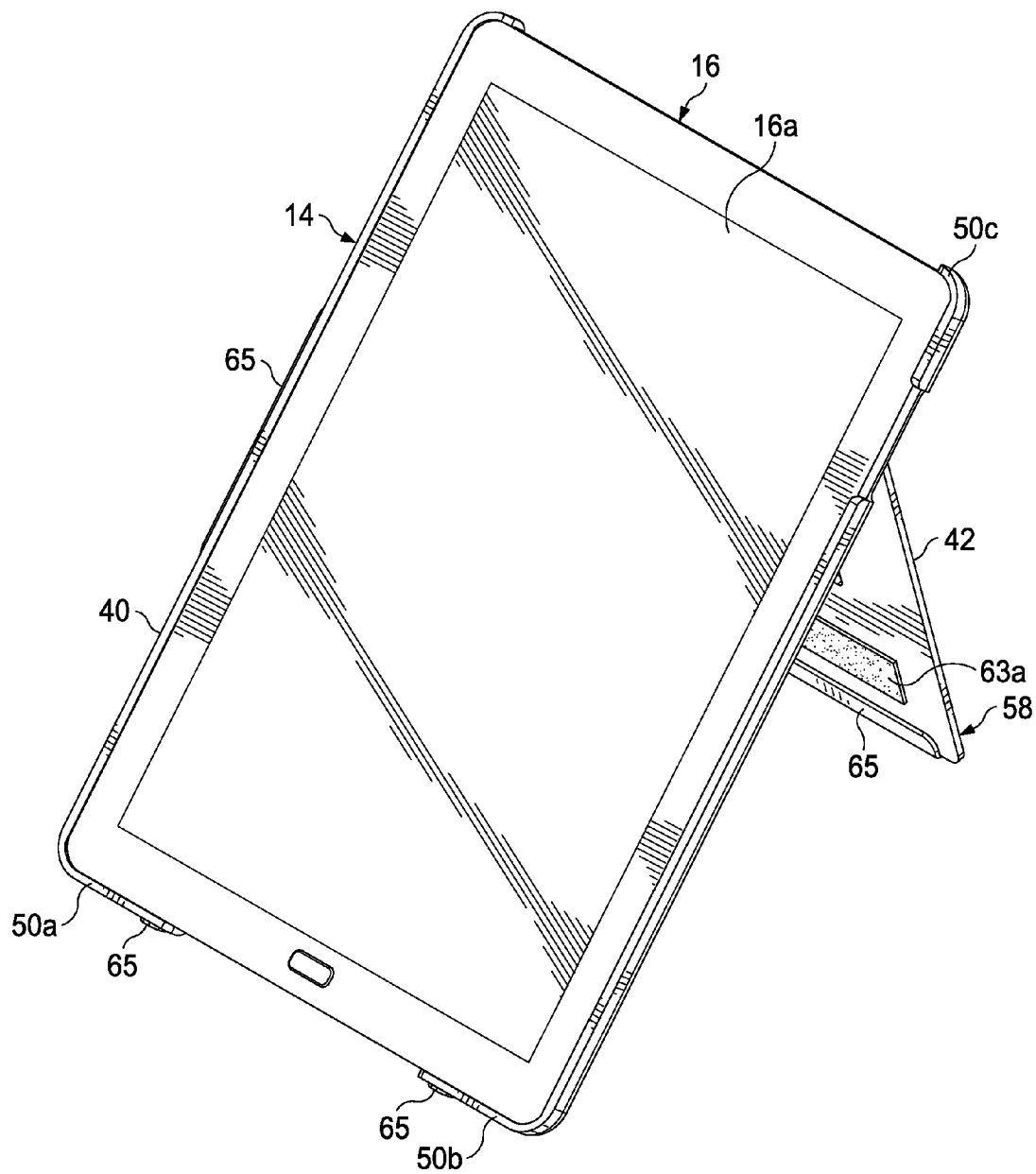
FIG. 17 is a front perspective view similar to that of FIG. 5, with the detachable stand supporting the tablet computer in a portrait viewing orientation, according to an exemplary embodiment.

As shown in FIG. 17, the tablet computer 16 may be supported in the stand-alone configuration and in an easel-like fashion, with the stand 14 detached from the case 12 and placed in a portrait orientation. In several exemplary embodiments, the one or more shoes, boots, or stoppers 65 connected to one or both of the walls 50a and 50b along the edge 46b, as well as to the end portion 58a of the pivoting portion 58, grip or better engage the horizontal surface on which the stand 14 rests. As a result, the shoes, boots, or stoppers 65 enable the arm 42 to support the holder 40 in the portrait orientation without slipping relative to the horizontal surface on which the stand 14 rests. In several exemplary embodiments, the stand 14 does not include the arm 42 and thus the stand 14 supports the tablet computer 16 by the engagement of the back surface 44b of the holder 44 with, for example, either a horizontal surface (such as a tabletop surface) in the portrait orientation, or both a book and the horizontal surface so that the tablet computer 16 extends angularly to facilitate the viewing thereof in the portrait orientation. In several exemplary embodiments, the stand 14 supports the table computer 16 when the arm 42 is in retracted position, by the engagement of the back surface 44b and/or the arm 42 with, for example, either a horizontal surface (such as a tabletop surface) in the landscape orientation, or both a book and the horizontal surface so that the tablet computer 16 extends angularly to facilitate the viewing thereof in the portrait orientation.

Figure 18:
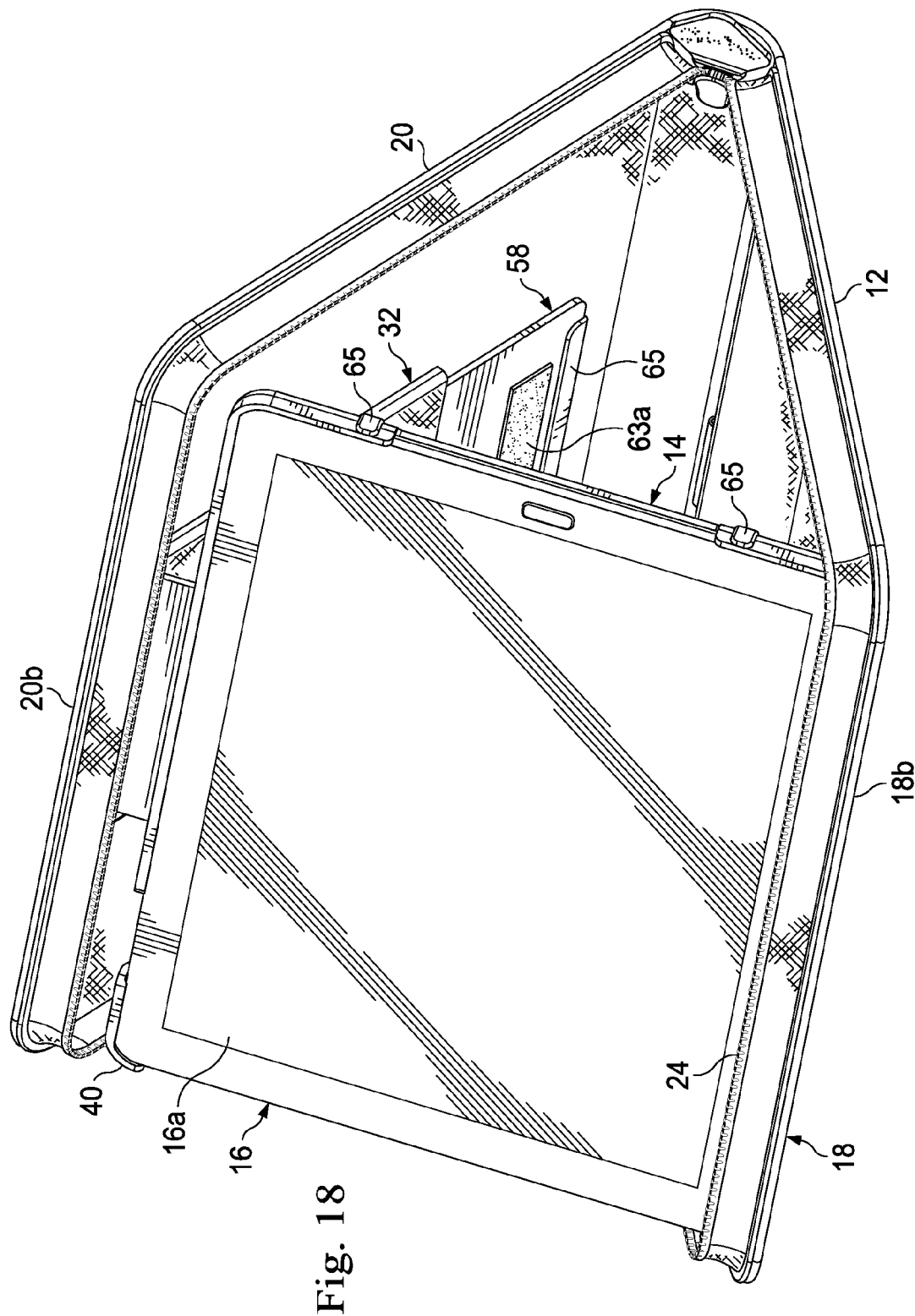
FIG. 18 is a front perspective view similar to that of FIG. 14, with the case and detachable stand being detachably coupled to each other and supporting the tablet computer in a landscape viewing orientation, according to an exemplary embodiment.

As shown in FIG. 18, the tablet computer 16 can be supported in an assembled configuration, with the stand 14 detachably coupled to the case 12 and placed in a landscape orientation. In an exemplary embodiment, the tablet computer 16 can be placed in the landscape orientation by using the closure member 24 to support a relatively long edge of the tablet computer 16 and one of the edges 46c or 46d of the holder 40 in a position proximate the outer edge 18b of the front cover 18. In this position, the closure member 24 retains the relatively long edge of the tablet computer 16 (corresponding to one of the edges 46c or 46d) adjacent the outer edge 18b of the front cover 18. In this position, in several exemplary embodiments, the stand 14 and/or the tablet computer 16 engage one or both of the inside surface 18a and the closure member 24. Alternatively, in several exemplary embodiments, the stand 14 and the tablet computer 16 extend past the closure member 24, and the stand 14 and/or the table computer 16 engage the horizontal surface upon which the front cover 18 rests.

Figure 19:
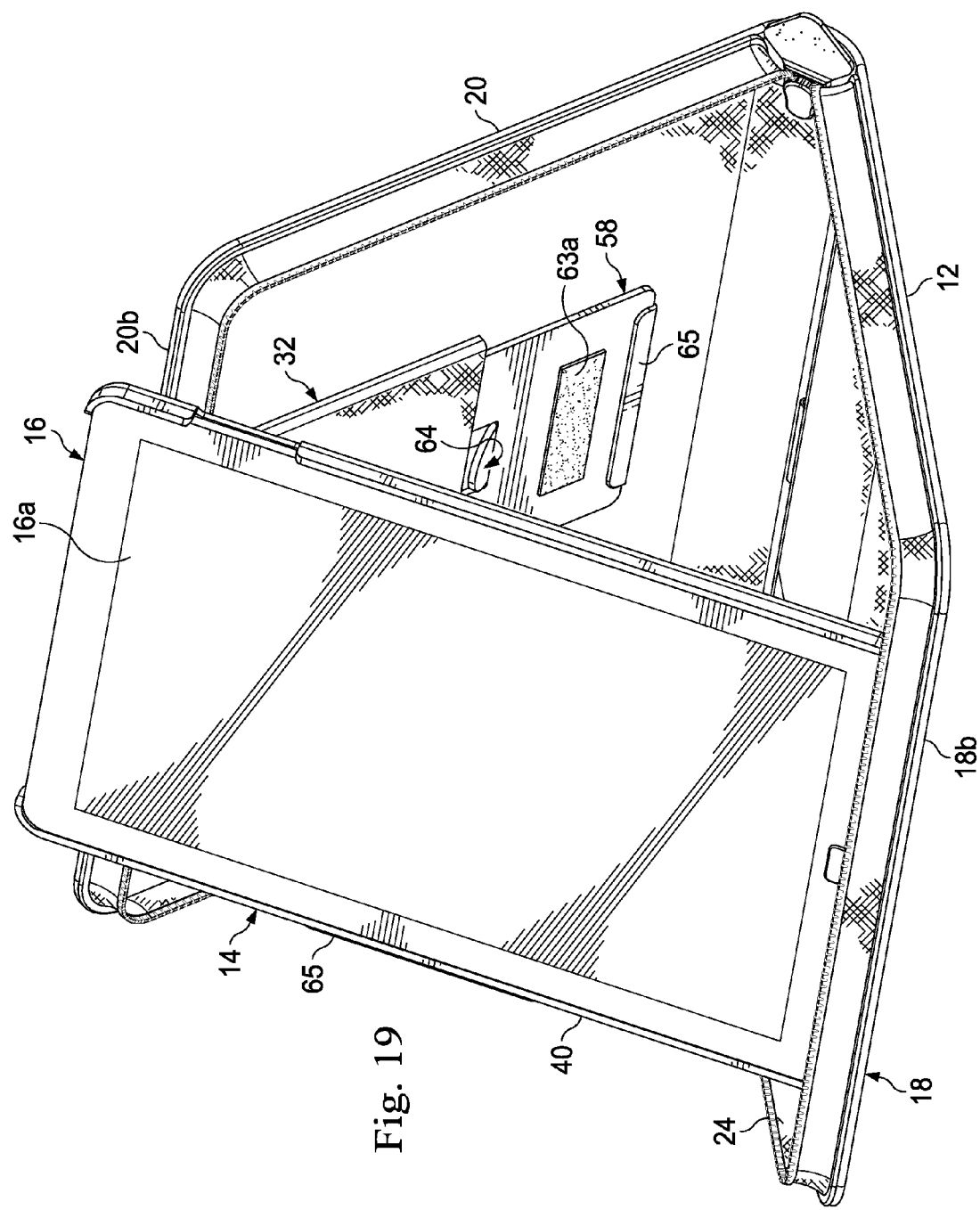
FIG. 19 is a front perspective view similar to that of FIG. 15, with the case and detachable stand being detachably coupled to each other and supporting the tablet computer in a portrait viewing orientation, according to an exemplary embodiment.

As shown in FIG. 19, the tablet computer 16 can be supported in the assembled configuration, with the stand 14 detachably coupled to the case 12 and placed in a portrait orientation. In an exemplary embodiment, the tablet computer 16 can be placed in the portrait orientation by using the closure member 24 to support a relatively short edge of the tablet computer 16 and one of the edges 46a or 46b of the holder 40 in a position proximate the outer edge 18b of the front cover 18. In this position, the closure member 24 retains the relatively short edge of the tablet computer 16 (corresponding to one of the edges 46a or 46b) adjacent the outer edge 18b of the front cover 18. In this position, in several exemplary embodiments, the stand 14 and/or the tablet computer 16 engage one or both of the inside surface 18a and the closure member 24. Alternatively, in several exemplary embodiments, the stand 14 and the tablet computer 16 extend past the closure member 24, and the stand 14 and/or the table computer 16 engage the horizontal surface upon which the front cover 18 rests.

Figure 20:
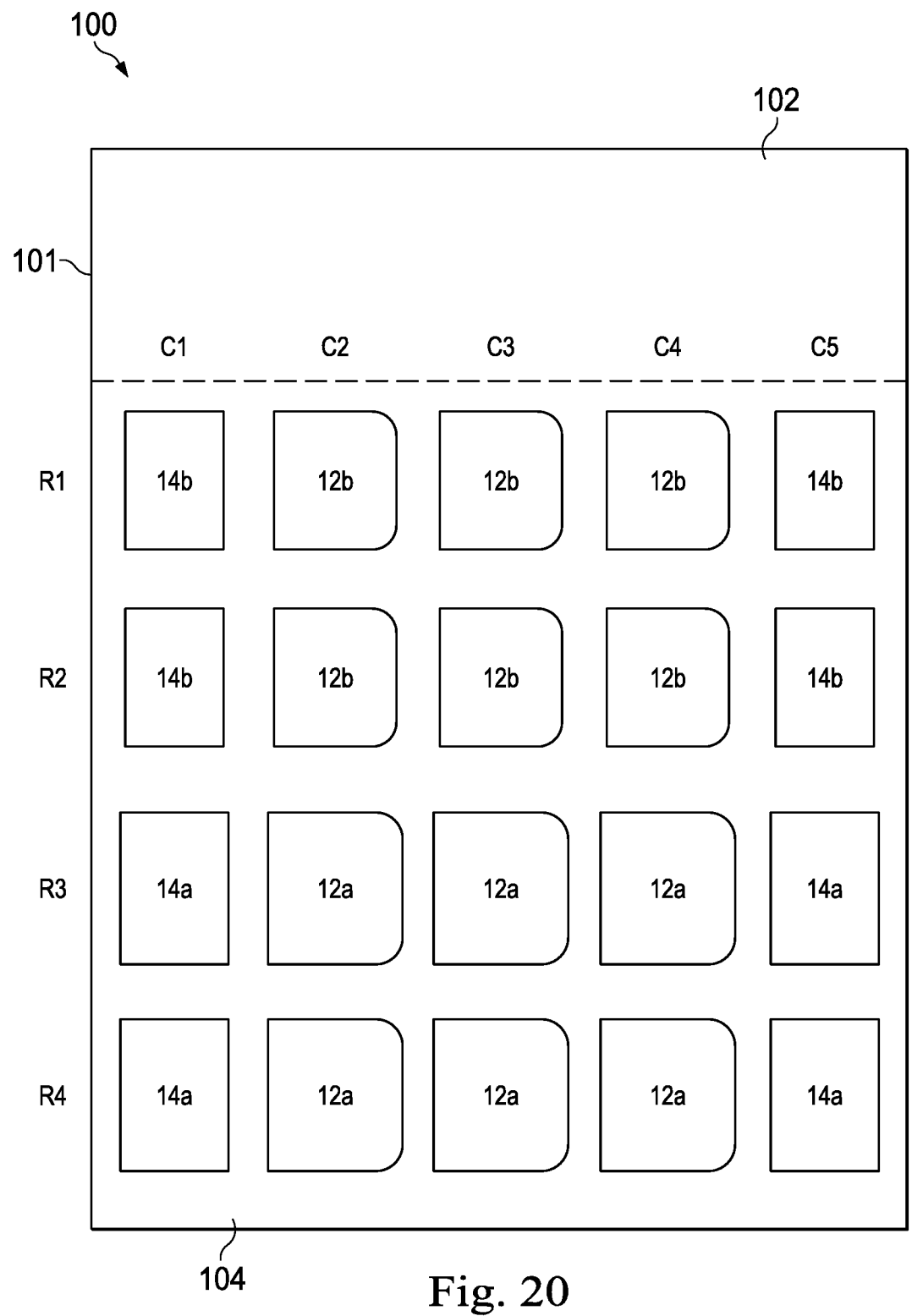
FIG. 20 is a diagrammatic illustration of a retail display for one or more of the case and detachable stand of FIGS. 1-19, according to an exemplary embodiment.

In an exemplary embodiment, as illustrated in FIG. 20 with continuing reference to FIGS. 1-19, a retail display is generally referred to by the reference numeral 100 and includes a panel 101, a product marketing portion 102, and a product display portion 104. The product marketing portion 102 may include any combination of pictures, text, or graphics, a portion or all of which are associated with the panel 101. In an exemplary embodiment, the product marketing portion 102 is displayed via the panel 101. In an exemplary embodiment, the product marketing portion 102 is displayed via the panel 101. In an exemplary embodiment, in addition to, or instead of, the picture, text, or graphics, the product marketing portion 102 may include any number of product marketing materials such as, for example, audio presentations, visual presentations, audio/visual presentations, graphical user interfaces, flyers, brochures, leaflets, pamphlets, posters, other marketing materials, or any combination thereof. These product marketing materials are associated with the panel 101, and may be displayed via the panel 101.

The product display portion 104 includes a plurality of cases 12a, a plurality of cases 12b, a plurality of stands 14a, and a plurality of stands 14b, all of which are associated with the panel 101. In an exemplary embodiment, the stands 14a and 14b are connected or coupled to the panel 101. In an exemplary embodiment, the cases 12a and 12b are connected or coupled to the panel 101. Each of the cases 12a and 12b is identical to the case 12 described above in connection with FIGS. 1-19; however, the size of each of the cases 12a is greater than the size of each of the cases 12b. Each of the stands 14a and 14b is identical to the stand 14 described above in connection with FIGS. 1-19; however, the size of each of the stands 14a is greater than the size of each of the stands 14b.

In an exemplary embodiment, each of the stands 14a is adapted to support or accommodate a tablet computer 16 that is relatively larger in size than a tablet computer 16 that each of the stands 14b is adapted to support or accommodate. In several exemplary embodiments, separate ones of the stands 14a are adapted to receive different ones of the relatively larger tablet computers 16 such as, for example, the Apple iPad®, the Apple iPad® 2, the Apple iPad® 3, the Apple iPad® 4, the Apple iPad Air®, the Apple iPad Air® 2, and the Samsung Galaxy Tab® 10.1, respectively. Each of the stands 14a is adapted to be detachably coupled to any one of the cases 12a, the stands 14a being adapted to accommodate one of the relatively larger tablet computers 16, as discussed above.

In an exemplary embodiment, each of the stands 14b is adapted to support or accommodate a tablet computer 16 that is relatively smaller in size than a tablet computer 16 that each of the stands 14a is adapted to support or accommodate. In several exemplary embodiments, separate ones of the stands 14b are adapted to receive different ones of the relatively smaller tablet computers 16 such as, for example, the Apple iPad Mini®, the Apple iPad Mini® 2, the Apple iPad Mini® 3, and the Samsung Galaxy Tab® 8.9, respectively. Each of the stands 14b is adapted to be detachably coupled to any one of the cases 12*b*, the stands 14*b* being adapted to support or accommodate one of the relatively smaller tablet computers 16, as discussed above.

In several exemplary embodiments, any one of the stands 14*a* or 14*b* may be detachably coupled to any one of the cases 12*a* or 12*b*, respectively, in a manner substantially identical to the manner in which the stand 14 is detachably coupled to the case 12, as described above with reference to FIGS. 1-19.

In an exemplary embodiment, the product display portion 104 displays the cases 12*a* and 12*b* and the stands 14*a* and 14*b* in five (5) columns C1-C5 and four (4) rows R1-R4. The stands 14*a* and 14*b* are displayed in the column C1 and the column C5. The stands 14*a*, which are adapted to receive different ones of the relatively larger tablet computers 16, are displayed in the row R3 and the row R4 of the columns C1 and C5. The stands 14*b*, which are adapted to receive different ones of the relatively smaller tablet computers 16, are displayed in the row R1 and the row R2 of the columns C1 and C5. The cases 12*a* and 12*b* are displayed in the columns C2-C4. The cases 12*a*, which are adapted to be detachably coupled to any one of the stands 14*a*, are displayed in the row R3 and the row R4 of the columns C2-C4. The cases 12*b*, which are adapted to be detachably coupled to any one of the stands 14*b*, are displayed in the row R1 and the row R2 of the columns C2-C4.

In an exemplary embodiment, the cases 12*a* and 12*b* have a variety of different colors and materials, thereby providing consumers with a product range that includes a variety of colors and materials to choose from for any one particular tablet computer 16. In several exemplary embodiments, since each of the stands 14*a* and 14*b* is detachable from any of the cases 12*a* and 12*b*, the cases 12*a* and 12*b* and the stands 14*a* and 14*b* are modular, reducing the amount of record-keeping, capital investment, and/or physical space required to maintain a product line capable of storing, protecting, and displaying a particular variety of the tablet computers 16. In an exemplary embodiment, the modularity of the cases 12*a* and 12*b* and the stands 14*a* and 14*b* allows retailers, especially those with limited record-keeping capabilities, physical space, and/or capital resources to offer a product line capable of storing, protecting, and displaying a wide variety of the tablet computers 16, with such a variety having different sizes and being manufactured by different vendors. In an exemplary embodiment, the modularity of the cases 12*a* and 12*b* and the stands 14*a* and 14*b* reduces the number of SKUs required to maintain a product line capable of storing, protecting, and displaying a particular variety of tablet computers 16. In an exemplary embodiment, the retail display 100 allows the consumer to quickly and accurately identify the stand 14*a* or 14*b* that is compatible with a particular tablet computer 16. Similarly, the retail display 100 allows the consumer to quickly and accurately identify the case 12*a* or 12*b* to which a particular stand 14*a* or 14*b* is adapted to be detachably coupled.

In several exemplary embodiments, a visual representation of the retail display 100, in whole or in part, may be displayed on an output device such as a multi-touch screen, touchpad, a computer screen, one or more graphical displays, and/or any combination thereof; in several exemplary embodiments, this visual representation of the retail display 100 may be part of a user interface via which a consumer may shop for a case 12 and/or a stand 14. In several exemplary embodiments, an apparatus is provided that includes a non-transitory computer readable medium and a plurality of instructions stored thereon, the plurality of instructions being accessible to, and executable by, one or more computer processors to provide a user interface by which a consumer may shop for and purchase one or more cases 12 and/or one or more stands 14, the user interface including a visual representation of the retail display 100, in whole or in part. In several exemplary embodiments, at least a portion of the visual representation of the retail display 100, including the product marketing portion 102 and/or the product display portion 104, are hosted on a website accessible via a network such as the Internet through an Internet address known as a uniform resource locator (URL).

The present disclosure introduces an apparatus adapted to support a mobile electronic device, the apparatus comprising: a case, the case comprising first and second covers, and a spine connecting the first and second covers so that the case has an open configuration and a closed configuration; and a stand adapted to be detachably coupled to the case, the stand comprising a holder, the holder comprising a body defining a front surface, the holder further comprising an opening formed in the front surface and through the body; wherein the apparatus has a first configuration in which the stand is detachably coupled to the case, and a second configuration in which the stand is detached from the case; wherein the holder is adapted to receive the mobile electronic device in each of the first and second configurations; wherein, when the mobile electronic device is received by the holder, the apparatus is in the first configuration, and the case is in the closed configuration: the mobile electronic device engages, or is at least proximate, each of the opening and the front surface of the body of the holder; and the spine and the first and second covers substantially cover the mobile electronic device; and wherein, when the mobile electronic device is received by the holder, the apparatus is in the first configuration, and the case is in the open configuration: the mobile electronic device engages, or is at least proximate, each of the opening and the front surface of the body of the holder; the holder is rotatable, using at least the opening, between a landscape viewing orientation and a portrait viewing orientation; and the apparatus is adapted to support the mobile electronic device in an easel-like fashion in each of the landscape viewing orientation and the portrait viewing orientation. In an exemplary embodiment, the arm comprises a first portion rotatably coupled to the holder, and a second portion hingedly connected to the first portion. In an exemplary embodiment, the case comprises a sleeve; wherein the sleeve at least partially defines a passage adapted to receive the second portion of the arm; and wherein the second portion of the arm extends within the passage when the apparatus is in the first configuration in which the stand is detachably coupled to the case. In an exemplary embodiment, the holder and the first portion of the stand are pivotable about the hinged connection between the first and second portions, and relative to each of the case and the second portion, when the apparatus is in the first configuration in which the stand is detachably coupled to the case and the second portion of the arm extends within the passage. In an exemplary embodiment, the arm has a retracted position in which the first and second portions are substantially parallel, and a deployed position in which the first and second portions are not substantially parallel and an angle greater than zero degrees is defined between the first and second portions. In an exemplary embodiment, the arm further comprises first and second connectors connected to the first and second portions, respectively; and wherein the first and second connectors are permitted to be connected together when the arm is in the retracted position to secure the arm in the retracted position. In an exemplary embodiment, the first and second covers define first and second inside surfaces, respectively, the sleeve being connected to one of the first and second inside surfaces. In an exemplary embodiment, the stand further comprises a coupling ring rotatably coupling the arm to the holder, at least a portion of the coupling ring extending within the opening; and wherein, when the mobile electronic device is received by the holder and the apparatus is in the second configuration: the holder is rotatable, using at least the opening and the coupling ring, between the landscape viewing orientation and the portrait viewing orientation; and the stand is adapted to support the mobile electronic device in an easel-like fashion in each of the landscape viewing orientation and the portrait viewing orientation.

The present disclosure also introduces an apparatus adapted to support a mobile electronic device, the apparatus comprising a case, the case comprising first and second covers defining first and second inside surfaces, respectively, and a spine connecting the first and second covers so that the case has open and closed configurations; wherein the case is configured so that: a first stand, to which the mobile electronic device is adapted to be secured, is adapted to be detachably coupled to the case so that, when the mobile electronic device is secured to the first stand, the first stand is detachably coupled to the case, and the case is in the closed configuration, the spine and the first and second covers substantially cover the mobile electronic device; and a second stand, to which another mobile electronic device is adapted to be secured, is adapted to be detachably coupled to the case so that, when the another mobile electronic device is secured to the second stand, the second stand is detachably coupled to the case, and the case is in the closed configuration, the spine and the first and second covers substantially cover the another mobile electronic device, the another mobile electronic device having a size that is different from the size of the first-mentioned mobile electronic device. In an exemplary embodiment, the case further comprises a closure member adapted to secure the first cover to the second cover when the case is in the closed configuration. In an exemplary embodiment, the case further comprises a sleeve connected to one of the first and second inside surfaces, the sleeve comprising opposing first and second end portions, the sleeve defining a passage, the passage extending between the opposing first and second end portions of the sleeve, the sleeve forming a first opening at the first end portion, the first opening providing access to the passage. In an exemplary embodiment, the apparatus further comprises the first stand, the first stand comprising a holder adapted to receive the first-mentioned mobile electronic device, and an arm coupled to the holder; wherein at least a portion of the arm extends within the passage, via the first opening, when the first stand is detachably coupled to the case. In an exemplary embodiment, the sleeve is connected to the second inside surface of the second cover, wherein the sleeve extends across a portion of the width of the second inside surface of the second cover, and wherein the sleeve is positioned mid-way along the length of the second inside surface of the second cover. In an exemplary embodiment, the second cover defines an outer edge that extends along the length of the second inside surface of the second cover; and wherein the position of the sleeve is shifted, along the width of the second inside surface and towards the outer edge of the second cover, so that the sleeve is not positioned mid-way along the width of the second inside surface of the second cover. In an exemplary embodiment, the passage is configured to receive at least a portion of the first stand when the first stand is detachably coupled to the case, the at least a portion of the first stand being adapted to be inserted into the first opening so that the passage receives the at least a portion of the first stand; and wherein the passage is configured to receive at least a portion of the second stand when the second stand is detachably coupled to the case, the at least a portion of the second stand being adapted to be inserted into the first opening so that the passage receives the at least a portion of the second stand.

The present disclosure also introduces an apparatus adapted to support a mobile electronic device, the apparatus comprising a stand, the stand comprising a holder to receive the mobile electronic device, the stand further comprising an arm rotatably coupled to the holder and adapted to support the holder in an easel-like fashion; wherein relative rotation between the holder and the arm is permitted. In an exemplary embodiment, relative rotation between the holder and the arm is permitted so that the arm is adapted to support the holder in an easel-like fashion in a landscape viewing orientation; and wherein relative rotation between the holder and the arm is permitted so that the arm is adapted to support the holder in an easel-like fashion in a portrait viewing orientation. In an exemplary embodiment, the arm comprises a first portion rotatably coupled to the holder, and a second portion hingedly connected to the first portion. In an exemplary embodiment, each of the first and second portions is pivotable about the hinged connection therebetween so that the arm has: a retracted position in which the first and second portions are substantially parallel; and a deployed position in which the first and second portions are not substantially parallel and an angle greater than zero degrees is defined between the first and second portions. In an exemplary embodiment, the arm further comprises first and second connectors connected to the first and second portions, respectively; and wherein the first and second connectors are permitted to be connected together when the arm is in the retracted position to secure the arm in the retracted position. In an exemplary embodiment, the apparatus further comprises a case to which the stand is adapted to be detachably coupled, the case comprising first and second covers defining first and second inside surfaces, respectively, and a spine connecting the first and second covers so that the case has open and closed configurations; wherein the spine and the first and second covers substantially cover the mobile electronic device when the mobile electronic device is received by the holder, the stand is detachably coupled to the case, and the case is in the closed configuration. In an exemplary embodiment, the case comprises a sleeve connected to one of the first and second inside surfaces, the sleeve defining a passage; and wherein the second portion of the arm extends within the passage when the stand is detachably coupled to the case.

The present disclosure also introduces a kit comprising a first stand adapted to support a first mobile electronic device, the first mobile electronic device having a first size; a second stand adapted to support a second mobile electronic device that is different from the first mobile electronic device, the second mobile electronic device having a second size that is different from the first size of the first mobile electronic device; and a first case to which each of the first and second stands is adapted to be detachably coupled, the first case comprising first and second covers defining first and second inside surfaces, respectively, and a spine connecting the first and second covers so that the first case has open and closed configurations; wherein the first case is adapted to substantially cover the first mobile electronic device when the first stand supports the first mobile electronic device, the first stand is detachably coupled to the first case, and the first case is in its closed configuration; and wherein the first case is adapted to substantially cover the second mobile electronic device when the second stand supports the second mobile electronic device, the second stand is detachably coupled to the first case, and the first case is in its closed configuration. In an exemplary embodiment, the apparatus further comprises a second case to which each of the first and second stands is adapted to be coupled, the second case having open and closed configurations; wherein the second case is adapted to substantially cover the first mobile electronic device when the first stand supports the first mobile electronic device, the first stand is detachably coupled to the second case, and the second case is in its closed configuration; and wherein the second case is adapted to substantially cover the second mobile electronic device when the second stand supports the second mobile electronic device, the second stand is detachably coupled to the second case, and the second case is in its closed configuration. In an exemplary embodiment, the first stand is adapted to support the first mobile electronic device regardless of whether the first stand is detachably coupled to the first case; and wherein the second stand is adapted to support the second mobile electronic device regardless of whether the second stand is detachably coupled to the second case. In an exemplary embodiment, the kit further comprises a panel with which the first stand, the second stand, the first case, and the second case are adapted to be associated when: the first stand is detached from each of the first and second cases, and the second stand is detached from each of the first and second cases. In an exemplary embodiment, the kit is a retail display kit; and wherein the first stand, the second stand, the first case, and the second case at least partially form a product display portion when the first stand, the second stand, the first case, and the second case are associated with the panel. In an exemplary embodiment, the first stand and the second stand are displayed in a first column or row when the first stand and the second stand are associated with the panel; and wherein the first case and the second case are displayed in a second column or row when the first case and the second case are associated with the panel.

The present disclosure also introduces an apparatus adapted to support a mobile electronic device, the apparatus comprising a case and a stand adapted to be detachably coupled to the case, the stand comprising a holder adapted to receive the mobile electronic device; wherein the apparatus has a first configuration in which the stand is detachably coupled to the case, and a second configuration in which the stand is detached from the case; wherein the holder is rotatable, between a landscape viewing orientation and a portrait viewing orientation, when the apparatus is in either the first configuration or the second configuration; and wherein the stand is adapted to support the mobile electronic device in an easel-like fashion when the apparatus is in either the first configuration or the second configuration. In an exemplary embodiment, the stand further comprises an arm rotatably coupled to the holder; wherein relative rotation between the holder and the arm is permitted. In an exemplary embodiment, the arm comprises a first portion rotatably coupled to the holder, and a second portion hingedly connected to the first portion. In an exemplary embodiment, the case comprises a sleeve; wherein the sleeve at least partially defines a passage adapted to receive the second portion of the arm; and wherein the second portion of the arm extends within the passage when the apparatus is in the first configuration in which the stand is detachably coupled to the case. In an exemplary embodiment, the holder and the first portion of the stand are pivotable about the hinged connection between the first and second portions, and relative to each of the case and the second portion, when the apparatus is in the first configuration in which the stand is detachably coupled to the case and the second portion of the arm extends within the passage. In an exemplary embodiment, the arm has a retracted position in which the first and second portions are substantially parallel, and a deployed position in which the first and second portions are not substantially parallel and an angle greater than zero degrees is defined between the first and second portions. In an exemplary embodiment, the arm further comprises first and second connectors connected to the first and second portions, respectively; and wherein the first and second connectors are permitted to be connected together when the arm is in the retracted position to secure the arm in the retracted position. In an exemplary embodiment, the case comprises: first and second covers defining first and second inside surfaces, respectively, the sleeve being connected to one of the first and second inside surfaces; and a spine connecting the first and second covers so that the case has an open configuration and a closed configuration.

The present disclosure also introduces one or more methods according to one or more aspects of the present disclosure.

The present disclosure also introduces one or more systems according to one or more aspects of the present disclosure.

It is understood that variations may be made in the foregoing without departing from the scope of the disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been disclosed in detail above, the embodiments disclosed are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An apparatus adapted to support a mobile electronic device, the apparatus comprising: a case, the case comprising first and second covers, and a spine connecting the first and second covers so that the case has an open configuration and a closed configuration; and a stand adapted to be detachably coupled to the case, the stand comprising a holder, the holder comprising a body defining a front surface, the holder further comprising an opening formed in the front surface and through the body; wherein the apparatus has a first configuration in which the stand is detachably coupled to the case, and a second configuration in which the stand is detached from the case; wherein the holder is adapted to receive the mobile electronic device in each of the first and second configurations; wherein, when the mobile electronic device is received by the holder, the apparatus is in the first configuration, and the case is in the closed configuration: the mobile electronic device engages, or is at least proximate, each of the opening and the front surface of the body of the holder; and the spine and the first and second covers substantially cover the mobile electronic device; and wherein, when the mobile electronic device is received by the holder, the apparatus is in the first configuration, and the case is in the open configuration: the mobile electronic device engages, or is at least proximate, each of the opening and the front surface of the body of the holder; the holder is rotatable, using at least the opening, between a landscape viewing orientation and a portrait viewing orientation; and the apparatus is adapted to support the mobile electronic device in an easel-like fashion in each of the landscape viewing orientation and the portrait viewing orientation; wherein the stand further comprises an arm rotatably coupled to the holder; wherein relative rotation between the holder and the arm is permitted; wherein the arm comprises a first portion rotatably coupled to the holder, and a second portion hingedly connected to the first portion; wherein the case comprises a sleeve; wherein the sleeve at least partially defines a passage adapted to receive the second portion of the arm; and wherein the second portion of the arm extends within the passage when the apparatus is in the first configuration in which the stand is detachably coupled to the case.

2. The apparatus of claim 1, wherein the holder and the first portion of the stand are pivotable about the hinged connection between the first and second portions, and relative to each of the case and the second portion, when the apparatus is in the first configuration in which the stand is detachably coupled to the case and the second portion of the arm extends within the passage.

3. The apparatus of claim 2, wherein the arm has a retracted position in which the first and second portions are substantially parallel, and a deployed position in which the first and second portions are not substantially parallel and an angle greater than zero degrees is defined between the first and second portions.

4. The apparatus of claim 3, wherein the arm further comprises first and second connectors connected to the first and second portions, respectively; and wherein the first and second connectors are permitted to be connected together when the arm is in the retracted position to secure the arm in the retracted position.

5. The apparatus of claim 1, wherein the first and second covers define first and second inside surfaces, respectively, the sleeve being connected to one of the first and second inside surfaces.

6. An apparatus adapted to support a mobile electronic device, the apparatus comprising: a case, the case comprising first and second covers, and a spine connecting the first and second covers so that the case has an open configuration and a closed configuration; and a stand adapted to be detachably coupled to the case, the stand comprising a holder, the holder comprising a body defining a front surface, the holder further comprising an opening formed in the front surface and through the body; wherein the apparatus has a first configuration in which the stand is detachably coupled to the case, and a second configuration in which the stand is detached from the case; wherein the holder is adapted to receive the mobile electronic device in each of the first and second configurations; wherein, when the mobile electronic device is received by the holder, the apparatus is in the first configuration, and the case is in the closed configuration: the mobile electronic device engages, or is at least proximate, each of the opening and the front surface of the body of the holder; and the spine and the first and second covers substantially cover the mobile electronic device; wherein, when the mobile electronic device is received by the holder, the apparatus is in the first configuration, and the case is in the open configuration: the mobile electronic device engages, or is at least proximate, each of the opening and the front surface of the body of the holder; the holder is rotatable, using at least the opening, between a landscape viewing orientation and a portrait viewing orientation; and the apparatus is adapted to support the mobile electronic device in an easel-like fashion in each of the landscape viewing orientation and the portrait viewing orientation; wherein the stand further comprises an arm rotatably coupled to the holder; wherein relative rotation between the holder and the arm is permitted; and wherein the stand further comprises a coupling ring rotatably coupling the arm to the holder, at least a portion of the coupling ring extending within the opening; and wherein, when the mobile electronic device is received by the holder and the apparatus is in the second configuration: the holder is rotatable, using at least the opening and the coupling ring, between the landscape viewing orientation and the portrait viewing orientation; and the stand is adapted to support the mobile electronic device in an easel-like fashion in each of the landscape viewing orientation and the portrait viewing orientation.

7. An apparatus adapted to support a mobile electronic device, the apparatus comprising: a case and a stand adapted to be detachably coupled to the case, the stand comprising a holder adapted to receive the mobile electronic device; wherein the apparatus has a first configuration in which the stand is detachably coupled to the case, and a second configuration in which the stand is detached from the case; wherein the holder is rotatable, between a landscape viewing orientation and a portrait viewing orientation, when the apparatus is in either the first configuration or the second configuration; and wherein the stand is adapted to support the mobile electronic device in an easel-like fashion when the apparatus is in either the first configuration or the second configuration; wherein the stand further comprises an arm rotatably coupled to the holder; wherein relative rotation between the holder and the arm is permitted; wherein the arm comprises a first portion rotatably coupled to the holder, and a second portion hingedly connected to the first portion; wherein the case comprises a sleeve; wherein the sleeve at least partially defines a passage adapted to receive the second portion of the arm; and wherein the second portion of the arm extends within the passage when the apparatus is in the first configuration in which the stand is detachably coupled to the case.

8. The apparatus of claim 7, wherein the holder and the first portion of the stand are pivotable about the hinged connection between the first and second portions, and relative to each of the case and the second portion, when the apparatus is in the first configuration in which the stand is detachably coupled to the case and the second portion of the arm extends within the passage.

9. The apparatus of claim 7, wherein the arm has a retracted position in which the first and second portions are substantially parallel, and a deployed position in which the first and second portions are not substantially parallel and an angle greater than zero degrees is defined between the first and second portions.

10. The apparatus of claim 9, wherein the arm further comprises first and second connectors connected to the first and second portions, respectively; and wherein the first and second connectors are permitted to be connected together when the arm is in the retracted position to secure the arm in the retracted position.

11. The apparatus of claim 7, wherein the case comprises: first and second covers defining first and second inside surfaces, respectively, the sleeve being connected to one of the first and second inside surfaces; and a spine connecting the first and second covers so that the case has an open configuration and a closed configuration.

12. An apparatus adapted to support a mobile electronic device, the apparatus comprising: a case and a stand adapted to be detachably coupled to the case, the stand comprising a holder adapted to receive the mobile electronic device; wherein the apparatus has a first configuration in which the stand is detachably coupled to the case, and a second configuration in which the stand is detached from the case; wherein the stand further comprises an arm rotatably coupled to the holder; wherein relative rotation between the holder and the arm is permitted; wherein the arm comprises a first portion rotatably coupled to the holder, and a second portion hingedly connected to the first portion; wherein the case comprises a sleeve; wherein the sleeve at least partially defines a passage adapted to receive the second portion of the arm; and wherein the second portion of the arm extends within the passage when the apparatus is in the first configuration in which the stand is detachably coupled to the case.

13. The apparatus of claim 12, wherein the holder and the first portion of the stand are pivotable about the hinged connection between the first and second portions, and relative to each of the case and the second portion, when the apparatus is in the first configuration in which the stand is detachably coupled to the case and the second portion of the arm extends within the passage.

14. The apparatus of claim 12, wherein the case comprises: first and second covers defining first and second inside surfaces, respectively, the sleeve being connected to one of the first and second inside surfaces; and a spine connecting the first and second covers so that the case has an open and a closed configuration.

15. The apparatus of claim 12, wherein the holder comprises a body defining a front and back surface.

16. The apparatus of claim 15, wherein the body of the holder comprises: parallel-spaced first and second edges, and parallel-spaced third and fourth edges; wherein the first and third edges are adjacent and a first corner is formed therebetween; wherein the third and second edges are adjacent and a second corner is formed therebetween; wherein the second and fourth edges are adjacent and a third corner is formed therebetween; wherein the fourth and first edges are adjacent and a fourth corner is formed therebetween.

17. The apparatus of claim 16, wherein the holder further comprises a first wall extending from at least the first corner, the third edge, and the second corner; wherein the first wall extends from the front surface, curving upwardly and defining a first curved inside surface; and wherein a first lip is formed at the distal end of the first curved inside surface.

18. The apparatus of claim 17, wherein the holder further comprises a second wall extending from at least the third corner and a portion of the fourth edge; wherein the second wall extends from the front surface, curving upwardly and defining a second curved inside surface; and wherein a second lip is formed at the distal end of the second curved inside surface.

19. The apparatus of claim 18, wherein the holder further comprises a third wall extending from at least the fourth corner; wherein the third wall extends from the front surface, curving upwardly and defining a third curved inside surface; and wherein a third lip is formed at the distal end of the third curved surface.

20. The apparatus of claim 19, wherein the holder is adapted to receive the mobile electronic device so that the first, second, and third curved inside surfaces accommodate respective portions of the mobile electronic device, so that the mobile electronic device engages, or is at least proximate, the front surface of the body, and so that the first, second, and third walls flex to accommodate the respective portions of the mobile electronic device.

21. The apparatus of claim 20, wherein the holder is adapted to receive the mobile electronic device so that the first, second, and third lips snap into place over respective edges of the mobile electronic device.

22. The apparatus of claim 19, wherein the first wall is integrally formed with at least the first corner, the third edge, and the second corner; wherein the second wall is integrally formed with at least the third corner and the portion of the fourth edge; and wherein the third wall is integrally formed with at least the fourth corner.

23. The apparatus of claim 15, wherein the holder is adapted to receive the mobile electronic device so that the mobile electronic device engages, or is at least proximate, the front surface of the body.

24. The apparatus of claim 12, wherein the stand further comprises: an opening formed through the second portion of the arm; and a tab connected to the second portion, at least a portion of the tab extending within the opening.

25. The apparatus of claim 24, wherein the tab either is proximate, or engages, an end portion of the sleeve when the apparatus is in the first configuration in which the stand is detachably coupled to the case.

26. The apparatus of claim 24, wherein the distal end of the tab is offset from the second portion of the arm when the apparatus is in either the first configuration or the second configuration.

27. The apparatus of claim 12, wherein the stand further comprises: an opening formed through the first portion of the arm; and wherein the apparatus further comprises a coupling ring, which rotatably couples the arm to the holder, the coupling ring comprising: an annular portion extending within the opening; and a flange to which the annular portion is attached, wherein the first portion of the arm contacts, or nearly contacts, an inner face of the flange.

28. The apparatus of claim 12, further comprising a stopper connected to an end portion of the second portion, wherein the stopper is centered on, and extends along, an edge of the end portion of the second portion.

\* \* \* \* \*